US006514446B1

(12) United States Patent
Smith et al.

(10) Patent No.: US 6,514,446 B1
(45) Date of Patent: Feb. 4, 2003

(54) COLORED ARTICLES AND COMPOSITIONS AND METHODS FOR THEIR FABRICATION

(75) Inventors: Tammy Lynn Smith, Belle Mead, NJ (US); Ray Baughman, Morris Plains, NJ (US); Mary Frances Martin, Hillsdale, NJ (US); Wonsik Choi, Philadelphia, PA (US); Jeffrey Moulton, Morristown, NJ (US)

(73) Assignee: AlliedSignal Inc., Morristown, NJ (US)

( * ) Notice: Subject to any disclaimer, the term of this patent is extended or adjusted under 35 U.S.C. 154(b) by 133 days.

(21) Appl. No.: 09/721,005

(22) Filed: Nov. 22, 2000

Related U.S. Application Data

(62) Division of application No. 09/338,629, filed on Jun. 23, 1999, now Pat. No. 6,153,299, which is a division of application No. 08/535,687, filed on Sep. 28, 1995, now Pat. No. 5,932,309.

(51) Int. Cl.⁷ .................... B29C 41/00; B29C 51/00; B29C 41/46

(52) U.S. Cl. .................. 264/299; 264/319; 264/494; 264/496; 522/81; 106/38.2; 106/38.22; 106/38.3; 106/38.35; 523/200; 523/201; 523/205

(58) Field of Search .................. 106/38.2, 38.22, 106/38.35; 264/494, 496, 299, 319; 522/81; 428/46, 373, 494.4, 372, 364, 474.7; 523/201, 205, 200

(56) References Cited

U.S. PATENT DOCUMENTS

| | | | |
|---|---|---|---|
| 2,000,671 A | | 5/1935 | Singmaster ...................... 28/1 |
| 3,586,417 A | | 6/1971 | Fields .......................... 350/160 |
| 3,616,184 A | | 10/1971 | Katagiri et al. .............. 161/174 |
| 3,907,581 A | | 9/1975 | Willcox .................... 106/193 J |
| 4,017,318 A | | 4/1977 | Pierson et al. ................. 106/52 |
| 4,265,723 A | * | 5/1981 | Hesse et al. .................. 522/107 |
| 4,309,479 A | | 1/1982 | Naruse et al. ............... 428/297 |
| 4,425,287 A | * | 1/1984 | Hesse et al. ............. 156/275.5 |
| 4,555,534 A | * | 11/1985 | Atkins ......................... 523/507 |
| 4,612,150 A | | 9/1986 | De Howitt .................. 264/103 |
| 4,745,027 A | | 5/1988 | Maeda et al. ............... 428/372 |
| 4,849,318 A | | 7/1989 | Tsubota et al. ............. 430/137 |
| 4,917,810 A | | 4/1990 | Tsunooka et al. .......... 252/62.9 |
| 4,981,886 A | | 1/1991 | Nako et al. .................. 523/454 |
| 5,004,765 A | * | 4/1991 | Atkins et al. ............... 523/434 |
| 5,019,445 A | | 5/1991 | Sternlieb .................... 428/323 |
| 5,083,251 A | | 1/1992 | Parker ........................ 362/255 |
| 5,140,983 A | * | 8/1992 | Jinotti ................... 128/205.24 |
| 5,213,892 A | | 5/1993 | Bruckner .................... 428/372 |
| 5,233,465 A | | 8/1993 | Wheatley et al. ........... 359/359 |
| 5,279,663 A | * | 1/1994 | Kaliski ........................ 106/416 |
| 5,281,634 A | * | 1/1994 | Hesse et al. ................. 523/514 |
| 5,321,069 A | | 6/1994 | Owens ........................ 524/420 |
| 5,326,516 A | * | 7/1994 | Brannon ..................... 264/143 |
| 5,326,822 A | * | 7/1994 | Hesse et al. ................. 522/104 |
| 5,443,775 A | * | 8/1995 | Brannon ..................... 264/143 |
| 5,637,630 A | * | 6/1997 | Atkins ......................... 523/512 |
| 6,028,127 A | * | 2/2000 | Yanagase et al. ........... 523/171 |

FOREIGN PATENT DOCUMENTS

| | | |
|---|---|---|
| EP | 0 094 801 | 5/1983 |
| EP | 0 526 019 | 7/1992 |
| EP | 0 498 592 A2 * | 8/1992 |
| EP | 0 686 858 | 6/1995 |
| GB | 536740 | 5/1941 |
| GB | 1040426 | 8/1966 |
| GB | 1127767 | 9/1968 |
| GB | 2297752 | 8/1996 |
| JP | 60 009 984 | 1/1985 |
| JP | 01 104 813 | 4/1989 |
| JP | 01 111 007 | 4/1989 |
| JP | 01 148 805 | 6/1989 |
| WO | WO 92/20014 | 11/1992 |
| WO | WO 94/12352 | 6/1994 |

OTHER PUBLICATIONS

Encyclopedia of Polymer Science & Engineering, vol. 11, John Wiley & Sons, NY, 1998.

Lindsay, Karen F. "Rapid Prototyping Shapes Ups as Low–Cost Modeling Alternative", Modern Plastics, Aug. 1990. Pp. 40.42.

Neckers, D.C., "Stereolithography: An Introduction", Chemtech, Oct. 1990, pp. 615–619.

Balasubramanian, K., "New Christiansen Filters", Applied Optics, vol. 31, No. 10, Apr. 1, 1992.

Burnam, K.J., et al. "Nanocomposites Containing Nonoclusters of Ag, Cu, Pt, Os, Co3C, Fe2P, Ge, or Pt/Sn"; Nanostructured Materials, vol. 5, No. 2, pp. 155–169, 1995.

Gan, L.M. et al.; "Preparation of Conducting–Coated Barium Sulfate Namoparticles in Inverse Micro Polyaniline–emulsions", Materials Chemistry and Physics, 40(1995) pp. 94–98.

(List continued on next page.)

*Primary Examiner*—James J. Seidleck
*Assistant Examiner*—Sanza L McClendon
(74) *Attorney, Agent, or Firm*—Virginia Szigeti; Roger H. Criss; Margaret S. Millikin

(57) ABSTRACT

This invention provides improved methods and compositions for achieving material coloration using particle scattering. These coloration effects can be designed to be either highly stable or dependent upon the switching effects of either temperature, integrated thermal exposure, moisture absorption, or exposure to actinic radiation. Articles employing materials with these coloration effects are described. Composition comprise a solid, light-transmitting matrix component having a non-liquid particle scattering colorant dispersed. Articles are produced wherein another solid second matrix component has an electronic transition colorant dispersed therein and the first and second compositions are disposed on one another and optionally interpenetrate each other. Colored articles are produced in the form of fibers, films and molded articles.

4 Claims, No Drawings

OTHER PUBLICATIONS

Dirix, Y., et al.; "Optical Properties of Oriented Polymer/Dye Polarizers", Macromolecules, 1995, 28, pp. 486–491.

Ma G.A., et al.; "Preparation and Chemical Fixation of Poly(4–vinylpyridine) Microgel Film with Ordered Structure"; Macromolecules; 1992, 25, pp., 1870–1875.

Carr, W.W., et al.; "Printing Textile Fabrics with Xerography", Color Xerography, May 1991, vol. 23, No. 5, pp. 33–42.

Daichuan, Dong, et al.; "Preparation of Uniform B–De)(OH) Colloidal Particles by Hydrolysis of Ferric Salts Microwave Irradiation", Materials Research Bulletin, vol. 30, No. 5, pp. 537–541, 1995.

Poborchii, V.V., et al.; "Cylindrical GaAs Quantum Wires Incorporated Within Chrysotile Asbestos Nanotubes: Fabrication and Polarized Optical Absorption Spectra"; Superlatices and Microstructures; vol. 16, No. 2, 1994, pp. 133–135.

Yitai, Q., et al.; "Hydrothermal Preparation and Characterization of Nanocrystallization Powder of Sphalerite", Materials Research Bulletin, vol. 30, No. 5, pp. 601–605, 1995.

Nagoa, Hiroyuki, et al., "Mechanism of Coloration in Copper–Stained Float Glass"; J. of Non–Crystalline Solids, 120 (1990) pp. 199–206.

Tamai, Hisashi, "Preparation and Characterization of Ultrafine Metal Particles Immobilized on Fine Polymer Particles"; Journal of Applied Polymer Science; vol. 56, pp. 441–449 (1995).

Philipse, Albert P.; "Solid Opaline Packings of Colloidal Silica Spheres"; J. Materials Science Letters; 8 (1989) 1371–1373.

Hirai, Hidefumi, et al.; "Preparation of Colloidal Transition Metals in Polymers by Reduction with Alcohols or Ethers", J. Macromol. Sci–Chem., A13(6), pp. 727–750 (1979).

* cited by examiner

COLORED ARTICLES AND COMPOSITIONS AND METHODS FOR THEIR FABRICATION

This application is a divisional of application Ser. No. 09/338,629 filed Jun. 23, 1999 now U.S. Pat. No. 6,153,299, which is a divisional of U.S. Ser. No. 08/535,687 filed Sep. 28, 1995 now U.S. Pat. No. 5,932,309.

BACKGROUND OF THE INVENTION

1. Field of the Invention

This invention relates to improved methods and compositions for the achievement of material coloration using particle scattering, as well as articles employing these material colorations.

2. Description of the Prior Art

In the prior art it is well known to color materials using dyes and pigments. Unfortunately, pigment and dye coloration agents suffer fading effects due to exposure to ultraviolet light, ozone or bleach. The usual cause of this fading is chemical changes in the colorant. These chemical changes alter the electronic transitions of the colorant, thereby causing undesired instability in color. For example, anthraquinone-based blue dyes fade upon exposure to ozone. Since most dyes contain a blue component, blue-fading causes fading in virtually every color.

It is very common in commerce to color polymers, however, colored polymer, such as dyed polymers are also difficult to recycle. Most high-value end-use applications require the separation of recycled plastics by color. However, due to the many colors available, separation by color is rarely done. Instead, most recycling companies separate plastics into a colorless lot and a mixed-color lot. Since dye removal is energy intensive, costly, and causes waste disposal problems for the spent dye, colored plastics remain in the mixed-color lot. Recycled polymer from this lot produces a marbled polymer or, at best, an off-green or brown polymer which has limited usefulness. Due to these difficulties, many recycling facilities do not even collect colored plastics. Those that do accept colored plastics often incinerate the mixed-color lot. Unfortunately, in some applications, such as carpets, almost all of the material available for recycling is colored. As a result, these polymers are rarely recycled. Consequently, billions of pounds of used carpets are discarded in landfills each year, thereby wasting valuable natural resources.

The use of chemical colorants, such as pigments or dyes, also potentially poses problems related to pigment toxicity and waste stream management. Many pigments contain toxic, heavy metals. A wet-dyeing process produces spent-dye baths. This dye-house effluent can have a negative environmental impact. The range of achievable optical effects is also restricted if the only colorants are dyes and pigments. A new technology is needed which will address fading, recyclability, dye-house effluent, and toxicity.

It would be advantageous to provide improved methods of coloration that provide switchability from one color state to another. Such color changing compositions can be used, for example, for cosmetic purposes in polymer fibers used for textiles and carpets and for color-changing windows and displays. Additionally, this type of technology could be used in military applications for camouflage clothing, tents, and machinery. If such color change is reversibly switched as a consequence of light exposure, temperature changes, or humidity changes, then chameleon effects can be achieved for such articles. If the color switching effect is a one-time event caused by actinic radiation or high temperature exposure, the switching effect can be used to provide spatially dependent coloration.

Enhancing the value of polymer films, fibers, coatings, and other articles by achieving novel optical effects provides a major commercial goal. One advance in this area is described in U.S. Pat. No. 5,233,465 which provides a polymer film having metallic luster resulting from the multiple layering of colorless polymers having differing refractive indices. These films and derived fibers are presently used for cosmetic purposes in many applications, such as for product packaging and textile articles. Another advance is provided by the formation of a parallel-line relief pattern on the surface of a polymer film. This also results in chromatic effects. without the use of dyes or pigments. A technology of this type in which the parallel-lines relief pattern consists of prisms is described in U.S. Pat. No. 4,805,984. Such polymer films are available commercially for solar window and light conduit applications.

The embossing of polymer films, especially metallized polymer films, to achieve novel optical effects is also well known. U.S. Pat. No. 4,886,687 describes non-pigmented coloration as a result of diffraction effects originating from an embossed pattern having 5,000 to 100,000 lines per inch (corresponding to a periodicity of about 0.25 to 5 microns). While such embossing provides striking visual effects for either films or film strips, such effects are difficult to perceive for polymer fibers having small diameters and conventional fiber cross-sections. Also, the embossing described in U.S. Pat. No. 4,886,687 is described to be preferably holographically generated by the interference of two coherent light beams. While such an embossing method can provide high reliability of the fidelity of the embossing process, it is also quite expensive.

Novel optical effects in silicate glasses have been achieved using colloidal particles of metals. U.S. Pat. No. 4,017,318 describes glass articles that, after exposure to actinic radiations, can be heat treated to provide coloration effects because of colloidal silver particles. U.S. Pat. Nos. 2,515,936; 2,515,943 and 2,651,145 also describe methods of generating colored silicate glasses using combinations of various colloidal metals, including colloidal gold and silver. Pearlescent compositions are also widely used to provide novel optical effects, including color, to polymer articles. These compositions, such as described in U.S. Pat. Nos. 3,087,829 and 4,146,403, provide coloration due to the interference of light reflected from parallel opposite sides of platelets deposited on the plate sides of mica substrate particles. This interference-derived coloration process critically depends upon the nearly perfect parallel arrangement of the reflecting surfaces of plates. Hence, such colorants are sometimes referred to as plate interference colorants. Due to the many micron diameter of the plates, such particles are unsuitable for the spinning of fibers of the types conventionally used for textiles and carpets, since the available pearlescent platelets have lateral dimensions that are comparable to the diameter of the such fibers. As a result, these platelets are either filtered out during the fiber spinning process or they clog spinneret holes. The pearlescent platelets are preferably aligned parallel to the polymer surface. Without such parallel alignment, the color effect is not as dramatic. Additionally, thick polymer articles are required in order for the iridescence to be pronounced at the loading levels that can be used without severely degrading polymer mechanical properties.

Christiansen filters have been known for over a century. Such filters usually consist of particles of a solid in a liquid matrix. The particles and the host matrix are chosen so that the wavelength dependence of the refractive index of the host matrix and particles are substantially different and there exist a wavelength at which the refractive index of the host matrix and the particles are equal. At that wavelength the filter is transmissive and at wavelengths remote from that wavelength the light is largely scattered and not transmitted. For effective operation at visible wavelengths, such filters should not contain components that significantly absorb light at these wavelengths. U.S. Pat. No. 3,586,417 shows that the wavelength at which a Christiansen filter transmits can be varied for an optical device by varying the temperature of the filter. Such variation results from the different temperature coefficients for the refractive indices of the scattering particles and the liquid matrix. Various new methods for producing Christiansen filters, including some efforts to make solid-matrix optical devices, are described by Balasubramanian, Applied Optics 31, pp. 1574–1587 (1992). While Christiansen filters are very useful for providing wavelength-selective light transmission for optical applications, means for obtaining specially enhanced coloration effects for scattered light using the Christiansen effect have not been previously demonstrated. Such enhanced effects for scattered light have critical importance for the development of new technologies for achieving material coloration.

The present invention eliminates the above described problems of prior art technologies by the use of coloration associated with particle scattering. Materials and methods for modifying and enhancing the coloration effects of particle scattering are provided by this invention.

SUMMARY OF THE INVENTION

The invention provides a composite article comprising a first composition and a second composition. The first composition comprises a solid first matrix component having a non-liquid particle scattering colorant dispersed therein, and the second composition comprises a solid second matrix component having an electronic transition colorant, dye or pigment dispersed therein. The first composition is either disposed on and substantially exterior to the second composition on at least one side of the article or the first and second compositions are substantially mutually interpenetrating. There exists at least one incident visible light wavelength and one light angle such that the first composition absorbs less than about 90% of the light incident on the article. The absorption coefficient of the first composition is less than about 50% of that of the second composition at a wavelength in the visible region of the spectrum. The particle scattering colorant does not have a highest peak in absorption coefficient that falls in the visible region of the spectrum. Either (a) the particle scattering colorant has a refractive index that matches that of the first matrix component at a wavelength in the visible and has an average particle size of less than about 2000 microns or (b) the average refractive index of the particle scattering colorant differs from that of the first matrix component by at least about 5% in the visible wavelength range, the average particle size of the particle scattering colorant in the smallest dimension is less than about 2 microns, and the particle scattering colorant, when dispersed in a colorless, isotropic liquid having a substantially different refractive index, is characterized at visible wavelengths as having an effective maximum absorbance that is at least about 2 times the effective minimum absorbance.

The invention also provides a fiber comprising a polymer matrix component in which particle scattering colorant particles are dispersed. The particle scattering colorant comprises either a semiconductor, a metallic conductor, a metal oxide or a salt. The particle scattering colorant has an average diameter in the smallest dimension of less than about 2 microns. The particle scattering colorant has a minimum in the transmitted light intensity ratio in the 380 to 750 nm range that is shifted at least by 10 nm compared with that obtained for the same semiconductor, metallic conductor, metal oxide or salt, having an average particle size above about 20 microns.

The invention further provides a composite article in fiber form comprising a polymer matrix having dispersed therein particles selected from the group consisting of ferroelectric, antiferroelectric and photoferroelectric particles. The invention also provides processes for producing composite articles.

The invention still further provides a polymer composition comprising in admixture, a polymer matrix, at least one particle scattering colorant, and at least one electronic transition colorant, dye or pigment wherein (a) either the refractive index difference between the polymer matrix and the particle scattering colorant or the absorption spectra of the electronic transition colorant, dye or pigment undergoes substantial change as a result of one or more of a temperature change, humidity change, an electric field change, pressure change, exposure to a chemical agent, integrated thermal exposure, or exposure to either light or actinic radiation and (b) states exist in which either the average refractive index of the particle scattering colorant and the polymer matrix differ by at least 5% in the entire visible spectral region or the refractive index of the particle scattering colorant and the polymer matrix are matched at a wavelength in the visible spectra region.

The invention also provides an article in the form of a film, fiber, or molded part comprising a particle scattering colorant dispersed in a polymer matrix, wherein the average particle size of the particle scattering colorant in its smallest dimension is less than about 2 microns and wherein either (a) the particle scattering colorant has a coating thereon and the refractive index of the coating differs from that of the polymer matrix by at least 10% at all wavelengths in the visible region of the spectrum or (b) the particle scattering colorant is comprised of a series of layers that differ in refractive indices between adjacent layers by at least 5%.

DETAILED DESCRIPTION OF THE PREFERRED EMBODIMENT

The invention provides improved methods and compositions for coloring materials using light scattering by particles that are dispersed within matrices which are at least partially light transmissive.

The colorants useful for this invention are called particle scattering colorants. Such colorants are distinguished from colorants that provide coloration due to the interference between light reflected from opposite parallel sides or interfaces of plate-like particles, called plate-like interference colorants, and those that provide coloration due to electronic transitions, called electronic transition colorants. While particle scattering colorants can provide a degree of coloration by electronic transitions, a colorant is a particle scattering colorant for the purpose of this invention only if coloration depends on the size of the particles and there is no significant coloration from the interference of light reflected from opposite sides or interfaces of parallel plates. Plate-like interference colorants are specifically excluded from the definition of particle scattering colorants. A plate-like interference colorant is a flat layered material comprising a flat plate layer having a thickness that is between 50 and 1000 nm.

In order for a material to be a particle scattering colorant, it must satisfy certain requirements that depend on the invention embodiment. Particle scattering colorants are either absorbing particle scattering colorants or non-absorbing particle scattering colorants depending on whether or not the particle scattering colorants significantly absorb light in the visible region of the spectrum. Absorption is evidenced by the visual perception of color when particle sizes are sufficiently large that particle scattering of light is not significant.

For invention embodiments of a first category, a particle colorant is used by dispersing it in a solid matrix that has a substantially different refractive index in the visible than that of the particle scattering colorant. For this first category, a particle scattering colorant is defined as a material that has either the A or B property as defined below.

The A or B properties are determined by dispersing the candidate particle scattering colorant in a colorless isotropic liquid that has a refractive index that is as different from that of the candidate particle scattering colorant as is conveniently obtainable. The most reliable test will result from choosing the refractive index difference of the liquid and the candidate particle scattering colorant to be as large as possible. This liquid-solid mixture containing only the candidate particle scattering colorant and the colorless isotropic liquid is referred to as the particle test mixture. The negative logarithmic ratio of transmitted light intensity to incident light intensity ($-\log(I/I_o)$) is measured for the particle test mixture as a continuous function of wavelength over a wavelength range that includes the entire visible spectral region from 380 to 750 nm. Such measurements, can be conveniently accomplished using an ordinary UV-visible spectrometer. The obtained quantity ($-\log(I/I_o)$) is called the effective absorbance, since it includes the effects of both scattering and absorption on reducing the intensity of transmitted light.

The A property is only a valid determinant for particle scattering colorants for materials which do not significantly absorb in the visible region of the spectrum, which means that absorption is not so large as to overwhelm the coloration effects due to particle scattering. For the sole purpose of the A property test, a material that does not significantly absorb in the visible region is defined as one whose particle test mixture has an effective maximum absorbance in the spectral region of from about 380 to about 750 nm that decreases by at least about 2 times and preferably at least about 3 times when the average particle size of the candidate particle scattering colorant is increased to above about 20 microns without changing the gravimetric concentration of the candidate particle scattering colorant in the particle test mixture.

It should be understood that the above described ratios of absorbances will in general have a weak dependence on the concentration of the candidate particle scattering colorant in the particle test mixture. Such dependence is usually so weak as to be unimportant for the determination of whether or not a material is a particle scattering colorant. However, for cases where a material is only marginally a particle scattering colorant (or is marginally not a particle scattering colorant) the above described ratios of absorbances should be evaluated at the concentration of the candidate particle scattering colorant intended for materials application. Also, it will be obvious to one skilled in the art that the concentration of the candidate particle scattering colorant in the test mixture should be sufficiently high that $I/I_o$ deviates significantly from unity, but not so high that I is too small to reliably measure.

A particle scattering colorant candidate that does not significantly absorb in the visible has the A property if the particle test mixture has an effective maximum absorbance in the spectral region of from about 380 to about 750 nm that is at least about 2 times and preferably at least about 3 times the effective minimum absorbance in the same wavelength range and the average particle size of the material is below about 20 microns.

If the candidate particle scattering colorant is significantly absorbing in the visible, it can alternatively be determined to be a particle scattering colorant if another material has the A property and that material does not significantly absorb in the visible and has substantially the same distribution of particle sizes and shapes as the candidate particle scattering colorant.

For scattering colorant candidates that significantly absorb in the visible, the B property is also suitable for determining whether or not a particulate material is a particle scattering colorant. The determination of whether or not the B property criterion is satisfied requires the same measurement of effective absorbance spectra in the visible region as used above. The B property criterion is satisfied if the candidate particle scattering colorant has a minimum in transmitted light intensity that is shifted at least by 10 nm compared with that obtained for the same composition having an average particle size above 20 microns.

In another invention embodiment, a colorant is formed when small particles, called primary particles are embedded within large particles. For this case, one can determine whether or not the candidate material is a particle scattering colorant by applying either the A property criterion or the B property criterion to either the primary particles or to the embedding particles that contain the primary particles.

These complexities in determining what is a particle scattering colorant disappear for invention embodiments of the second category, wherein the refractive index of a particle scattering colorant is matched to that of the matrix material at some wavelength in the visible. In such cases, any material that has a particle size less than 2000 microns is a particle scattering colorant. Likewise, the determination of whether or not a candidate is a particle scattering colorant is readily apparent when it comprises a two-dimensional or three-dimensional ordered array of primary particles. Large particles of such particle scattering colorants will have an opal-like iridescence that is apparent to the eye.

While the above determinations of whether or not a particulate material is a particle scattering colorant might seem complicated, they are quite simple and convenient to apply. Particulate materials are much easier to disperse in liquids than they would be to disperse in the solid matrices that provide the articles of this invention. Also, the measurements of effective absorbance required for applying either the A or B property criterion are rapid and can be accomplished by conventionally applied procedures using an inexpensive spectrometer. Hence, the application of these property criteria saves a great deal of time in the identification of materials (i.e., particle scattering colorants) that are suitable for the practice of this invention.

In certain preferred embodiments of this invention, electronic transition colorants are used in conjunction with particle scattering colorants. An electronic transition colorant is defined as a material that has an absorption coefficient greater than $10^{-1}$ $cm^{-1}$ at a wavelength in the visible and does not satisfy the criteria for a particle scattering colorant. Dyes and pigments are also used in conjunction with particle scattering colorants in embodiments of this invention. A dye or pigment is defined as a material that absorbs light in the visible to a sufficient extent to confer visibly perceptible coloration. Depending on particle size, a pigment can either be a particle scattering colorant or an electronic transition colorant. Also, in general, either electronic transition colorants, dyes, or pigments can be used interchangeably in invention embodiments.

In use, the particle scattering colorants used in the present invention are dispersed as particles in a surrounding matrix. These particle scattering colorants particles can be either randomly located or arranged in a positionally correlated manner within a host matrix. In either case, intense coloration effects can occur as a consequence of scattering from these particles. A positionally correlated arrangement of particle scattering colorants is preferred in order to achieve coloration effects that are somewhat flashy, and in some cases provide dramatically different coloration for different viewing angles. Such scattering processes for arrays of particles that have translational order are referred to as Bragg scattering. Non-correlated particle scattering colorants are preferred in order to achieve more subtle coloration effects, which can be intense even for non-absorbing particle scattering colorants.

Since the visual limits of light radiation are approximately between 380 and 750 nm, these limits are preferred to define the optical characteristics of the particle scattering colorants for the purposes of the present invention. In some embodiments of the invention, the particle scattering colorants that are preferred have a refractive index that is different from that of the host matrix throughout the entire visible spectral range from 380 to 750 nm and particle scattering effects are preferably enhanced using electronic transition colorants, dyes or pigments. This situation differs from that of the Christiansen filter materials of the prior art that provide matching of the refractive indices of host and matrix materials at least at one wavelength in the visible, and electronic transition colorants, dyes or pigments usually degrade performance. Unless otherwise specified, the described refractive indices are those measured at room temperature. Also, a particle scattering colorant is said to have a different refractive index, a lower refractive index, or a higher refractive index than a matrix material if there exists a light polarization direction for which this is true.

The particle scattering colorants, or a subcomponent thereof, should be small enough to effectively scatter light chromatically. If there does not exist a visible wavelength at which a refractive index of the scattering particle colorant and the matrix are substantially matched, this means that the average particle size of such colorants is preferably less than about 2 microns in the smallest dimension. By average particle size we mean the ordinary arithmetic average, rather than (for example) the root-mean-square average. For embodiments of this invention where chromatic coloration occurs as a consequence of the existence of a large difference between the refractive index of the matrix and the particle scattering colorant throughout the visible spectral region, the average particle size for the particle scattering colorants is more preferably from about 0.01 to about 0.4 microns. In this case the average particle size in the smallest dimension is most preferably less than about 0.2 microns. Especially if the particle scattering colorant significantly absorbs light in the visible, even smaller average particle sizes of less than 0.01 microns are within the preferred range. Also, if the particle scattering colorant particles are not preferentially oriented, it is preferable that the average ratio of maximum dimension to minimum dimension for individual particles of the particle scattering colorant is less than about four and that the particle scattering colorant particles have little dispersion in either particle size or shape.

On the other hand, for embodiments of this invention in which the refractive index of the particle scattering colorant and the matrix substantially vanishes at a visible wavelength, particle shapes can be quite irregular and preferred average particle sizes can be quite large, preferably less than about 2000 microns. Even larger particle sizes can be in the preferred range if the particle scattering colorant contains smaller particle scattering colorants within it. This complicated issue of preferred particle sizes for different embodiments of the invention will be further clarified in the discussion of these embodiments hereinafter.

Instead of expressing particle sizes by an average particle size or an average particle size in the smallest dimension, particle size for a particular particle scattering colorant can be expressed as the fraction of particles that have a smallest dimension that is smaller than a described limit. Such description is most useful for the embodiments of this invention where the refractive index of the particle scattering colorant is much different than that of the matrix at all wavelengths in the visible. In such embodiments, it is preferable that at least about 50% of all particles have a smallest dimension that is less than about 0.1 microns.

The matrix in which the particle scattering colorant is dispersed can be either absorbing or non-absorbing in the visible spectral range. This absorption characteristic can be specified using either path-length-dependent or path-length-independent quantities for characterization. For example, if an initial light intensity $I_o$ is reduced to $I_t$ by absorptive processes after the light passes through a matrix thickness t, then the percent transmission is $100(I_t/I_o)$. The corresponding absorption coefficient is $-(1/t)\ln((I_t/I_o))$. Unless otherwise specified, the described absorption characteristics are those for a light polarization direction for which there is least absorption of light. For certain applications it is preferable for the particle scattering colorant to be substantially non-absorbing in the visible region. For other applications it is sufficient for the particle scattering colorant to not have a highest peak in absorption peak within the visible. In other applications that will be described, it is preferable for the particle scattering colorant to have a maxima in absorption coefficient at wavelengths that are within the visible. The latter provides invention embodiments in which the particle scattering colorant contains an overcoating layer of an absorbing material that is sufficiently thin that it produces little light absorption.

Light scattering that is not strongly frequency dependent in the visible region will often occur as a result of imperfections in a matrix material. One example of such imperfections are crystallite-amorphous boundaries in semi-crystalline polymeric matrix materials. Such non-chromatic scattering can interfere with the achievement of coloration using particle scattering colorants. Consequently, it is useful to define the "effective absorption coefficient" using the above expressions, without correction for the scattering of the matrix that does not arise from the particle scattering colorants.

Because of their utility for the construction of various articles for which novel optical effects are desired, such as carpets, clothing, wall paper, draperies, coverings for furniture, polymer molded parts, and coatings, organic polymers are preferred as matrix materials for the compositions of this invention. By polymers we mean homopolymers, copolymers, and various mixtures thereof Various inorganic and mixed organic and inorganic matrix materials are also suitable for use as matrix materials for the present invention, such as $SiO_2$ glasses, and mixtures of inorganic and organic polymers. The principal limitation on the choice of such matrix materials is that either absorption or wavelength insensitive light scattering are not so dominant that the wavelength-selective scattering (i.e., chromatic scattering) due to particle scattering colorants is negligible. This limitation means that such matrix materials must have a degree of transparency. Using the above defined effective absorption coefficient, this requirement of transparency means that the effective absorption coefficient for the host matrix in which the particle scattering colorant particles are dispersed is preferably less than about $10^{-4}$ $\text{Å}^{-1}$ at some wavelength in the visible spectra. More preferably, this effective absorption coefficient of the host matrix is less than about $10^{-5}$ $\text{Å}^{-1}$ at some wavelength in the visible, and most preferably this effective absorption coefficient is less than about $10^{-6}$ $\text{Å}^{-1}$ at some wavelength in the visible. Numerous commercially available transparent organic polymers having lower effective absorption coefficients in the visible are especially suitable for use as matrix materials for the present invention. These include, for example, polyamides, polyurethanes, polyesters, polyacrylonitriles, and hydrocarbon polymers such as polyethylene and polypropylene. Amorphous polymers having very little scattering due to imperfections are especially preferred, such as an optical quality polyvinyl, acrylic, polysulfone, polycarbonate, polyarylate, or polystyrene.

Depending on the intensity of coloration desired, the loading level of the particle scattering colorant in the host matrix can be varied over a very wide range. As long as the particle scattering colorants do not become aggregated to the extent that large refractive index fluctuations are eliminated at interfaces between particles, the intensity of coloration will generally increase with the loading level of the particle scattering colorant. However, very high loading levels of the particle scattering colorant can degrade mechanical properties and intimate particle aggregation can dramatically decrease interfacial refractive index changes and alter the effective dimensions of scattering particles. For this reason the volumetric loading level of the particle scattering colorant in the host matrix is preferably less that about 70%, more preferably less than about 30%, and most preferably less than about 10%. However, in order to obtain a significant coloration effect, the particle scattering colorant preferably comprises at least about 0.01 weight percent of the matrix component, more preferably at least about 0.1 weight percent of the matrix component, and most preferably at least about 1.0 weight percent of the matrix component. Also, the required loading levels of particle scattering colorants can be lower for absorbing particle scattering colorants than for non-absorbing particle scattering colorants, and can be decreased in certain embodiments of the invention as either the refractive index difference between matrix and particle scattering colorant is increased or the thickness of the matrix containing the particle scattering colorant is increased.

Various methods of particle construction can be employed in the materials of the present invention for achieving the refractive index variations that are necessary in order to obtain strong particle scattering. Preferred methods include (1) the to simple particle method, (2) the surface-enhanced particle method, and (3) the onion-skin particle method. In the simple particle method, the particles are substantially uniform in composition and the refractive index of these particles is chosen to be different from that of the host matrix. Unless otherwise noted, comments made herein regarding the refractive index differences of particles and host matrices pertain either to the particle refractive index for the simple particle method or the outer particle layer for the case of more complex particles. In the surface-enhanced particle method, the particles contain an overcoat of an agent that has a refractive index which is different from that of the matrix. The refractive indices of the surface enhancement agent and the host matrix should preferably differ by at least about 5%. More preferably, this refractive index difference is greater than about 25%. Finally, in the onion-skin particle method, the scattering particles are multi-layered (like an onion skin) with layers having different refractive indices, so that scattering occurs from each interface between layers. This refractive index difference is preferably greater than about 5%, although smaller refractive index differences can be usefully employed if a large number of layers are present in the onion-skin structure.

In one embodiment of this invention for the simple particle method the refractive index of the scattering particles is higher than that of the matrix. In another embodiment the refractive index of the matrix is higher than that of the scattering particles. In both these embodiments the difference in refractive indices, of the scattering centers and the matrix should be maximized in order to enhance coloration due to particle scattering. Hence, these embodiments are referred to as large $\Delta n$ embodiments. More specifically, in the case where the scattering centers are inorganic particles and the matrix is an organic polymer, the difference in refractive index between the inorganic particles and the organic polymer should be maximized. This refractive index difference will generally depend on the direction of light polarization.

In other embodiments of this invention, the refractive index of the particle scattering colorants are closely matched at least at one wavelength in the visible. In these embodiments it is preferred that (1) there is a large difference in the wavelength dependence of the refractive index of the particle scattering colorant and the matrix polymer in the visual spectral region, (2) the matrix polymer and the particle scattering colorant have states that are optically isotropic, and (3) the neat matrix polymer has a very high transparency in the visible. Such embodiments, called vanishing $\Delta n$ embodiments, use the concept of the Christiansen filter to obtain coloration. The size of the particle scattering colorants are chosen so that all wavelengths in the visible region are scattered, except those in the vicinity of the wavelength at which the refractive index of the matrix and the particle scattering colorant are matched. This wavelength dependence of scattering efficiency either provides or enhances the article coloration.

Both the high $\Delta n$ embodiments and the vanishing $\Delta n$ embodiments provide the means for obtaining either stable coloration or switchable coloration. In the high $\Delta n$ embodiments, coloration that is switchable in a desired manner is preferably achieved using the combined effects of particle scattering and a wavelength-dependent absorption in the visible that is associated with an electronic transition. In the vanishing $\Delta n$ embodiments, coloration that is switchable in a desired manner can be achieved by effects (light or actinic radiation exposure, thermal exposure, electric fields, temperature, humidity, etc.) that either (1) shift the wavelength at which $\Delta n$ vanishes between two wavelengths within the visible range, (2) shift the wavelength at which $\Delta n$ vanishes to within the visible range, (3) shift the wavelength at which $\Delta n$ vanishes to outside the visible range, or (4) causes a shift in coloration due to combined effects of particle scattering and chromism in absorption in the visible that is associated with an electronic transition colorant, dye or pigment. One of the discoveries of the present invention is that ferroelectric, switchable antiferroelectric compositions, and photoferroelectric compositions provide preferred compositions for obtaining switchable coloration using particle scattering colorants.

Electronic transition colorants, dyes or pigments are especially preferred for obtaining switchable coloration for the high $\Delta n$ embodiments, even when such colorants do not undergo a switching of electron absorption coloration. The reason can be seen by considering a material (such as a polymer film) that is sufficiently thin that particles do not scatter all of the incident visible radiation. In this case of the high $\Delta n$ embodiment, the difference in refractive index of the particle scattering colorants and the matrix is large over the entire visible spectral range (compared with the wavelength dependence of $\Delta n$ over this range). Hence, changes in the refractive index difference between particle scattering colorant and matrix increases the overall intensity of scattered light, which is generally approximately exponentially proportional to $(\Delta n)^2$, but does not substantially change the wavelength distribution of such scattered light. On the other hand, the chromatic reflection and absorption of an electronic transition absorption colorant can provide switchability in the chromatic nature of scattered light, since the amount of incident light effected by the electronic transition colorant, dye or pigment can depend upon the amount of light that is not scattered by the particle scattering colorant. As an example, one may think of the situation where the scattering effectiveness and thickness of a particle scattering colorant layer is so great that substantially no light is transmitted through to a layer containing an electronic transition colorant. If the refractive index of the particle scattering colorant is then switched so that the refractive index of the particle scattering colorant becomes much closer to that of the matrix, then light can be substantially transmitted through the particle scattering colorant layer to the electronic transition colorant layer. Then a switchability in the refractive index of the particle scattering colorant provides a switchability in the coloration of the article. This situation is quite different from the case of the vanishing $\Delta n$ embodiment, where, even in the absence of an electronic absorption, an article that is sufficiently thin that it does not completely scatter light can evidence a switchability in the chromatic nature of scattered light. This can be true as long as there is a switchability in the wavelength in the visible at which $\Delta n$ vanishes and $\Delta n$ significantly depends upon wavelength in the visible. The wavelength dependence of refractive index in the visible is usefully provided as either $n_F - n_C$ or the Abbe number $((n_D - 1)/(n_F - n_C))$, where the subscripts F, D, and C indicate the values of the refractive index at 486.1, 589.3, 656.3 nm, respectively. For the purpose of obtaining enhanced coloration for the vanishing $\Delta n$ embodiment, the difference in $n_F - n_C$ for the particle scattering colorant and the matrix in which this colorant is dispersed is preferably greater in absolute magnitude than about 0.001.

Particle scattering colorants and electronic transition colorants can either be commingled together in the same matrix or mingled in separate matrices that are assembled so as to be either substantially mutually interpenetrating or substantially mutually non-interpenetrating. The latter case, where the particle scattering colorant and the electronic scattering colorant are in separate matrices that are substantially mutually non-interpenetrating, provides the more preferred embodiments of this invention, since the total intensity of light scattered by the particle scattering colorant can thereby be optimized. In this type of embodiment, the matrix containing the particle scattering colorant is preferably substantially exterior to that containing the electronic transition colorant on at least one side of a fashioned article. So that the effects of both a electronic transition colorant and a non-absorbing particle scattering colorant can be perceived, the thickness of the matrix containing the particle scattering colorant should be such that there exists a wavelength of visible light where from about 10% to about 90% light transmission occurs through the particle scattering colorant matrix layer, so as to reach the electronic transition colorant matrix layer. The preferred thickness of the electronic absorption colorant containing matrix layer that underlies the particle scattering colorant containing layer ($t_e$) depends upon the absorption coefficient of the electronic transition colorant at the wavelength in the visible at which the maximum absorption occurs ($\lambda_m$), which is called $\alpha_e$, and the volume fraction of the matrix that is the electronic transition colorant ($V_c$). Preferably, $\alpha_e t_e V_e$ is greater than 0.1, which corresponds to a 9.5% absorption at $\lambda_m$. Likewise, for the embodiments where the particle scattering colorant and the electronic absorption colorant are commingled in the same phase, it is useful to define analogous quantities for the particle scattering colorant (which are denoted by the subscripts s), the only difference being $\alpha_s$ for the particle scattering colorant includes the effects of both light absorption and light scattering on reducing the amount of light transmitted through the material and $\alpha_s$ depends on particle size. For these embodiments $\alpha_e V_e$ and $\alpha_s V_s$ preferably differ by less than a factor of about ten, and more preferably by a factor of less than about three. Likewise, preferred embodiments can be expressed for the case of where the particle scattering colorant and the electronic transition colorant are located in separate phases (with volumes $v_s$ and $v_e$, respectively) that are substantially mutually interpenetrating. In this case, $\alpha_c v_c V_c$ and $\alpha_s v_s V_s$ preferably differ by less than about a factor of ten, and more preferably by a factor of less than about three.

The variation in refractive indices with composition for organic polymers is relatively small compared with the corresponding variation for inorganic particles. Typical average values for various unoriented organic polymers at 589 nm are as follows: polyolefins (1.47–1.52), polystyrenes (1.59–1.61), polyfluoro-olefins (1.35–1.42), non-aromatic non-halogenated polyvinyls (1.45–1.52), polyacrylates (1.47–1.48), polymethacrylates (1.46–1.57), polydienes (1.51–1.56), polyoxides (1.45–1.51), polyamides (1.47–1.58), and polycarbonates (1.57–1.65). Especially preferred polymers for use as polymer host matrices are those that have little light scattering in the visible due to imperfections, such as polymers that are either morphous or have crystallite sizes that are much smaller than the wavelength of visible light. The latter polymers can be obtained, for example, by rapid melt-quenching methods.

Preferred scattering particles for combination in composites with polymers having such low refractive indices in high $\Delta n$ embodiments are high refractive index materials such as: 1) metal oxides such as titanium dioxide, zinc oxide, silica, zirconium oxide, antimony trioxide and alumina; 2) carbon phases such as diamond (n about 2.42), Lonsdaleite, and diamond-like carbon; 3) other high refractive index inorganics such as bismuth oxychloride (BiOCl), barium titanate ($n_o$ between 2.543 and 2.339 and $n_e$ between 2.644 and 2.392 for wavelengths between 420 and 670 nm), potassium lithium niobate ($n_o$ between 2.326 and 2.208 and $n_e$ between 2.197 and 2.112 for wavelengths between 532 and 1064 nm), lithium niobate ($n_o$ between 2.304 and 2.124 and $n_e$ between 2.414 and 2.202 for wavelengths between 420 and 2000 nm), lithium tantalate ($n_o$ between 2.242 and 2.112 and $n_e$ between 2.247 and 2.117 for wavelengths between 450 and 1800 nm), proustite ($n_o$ between 2.739 and 2.542 and $n_e$ between 3.019 and 2.765 for wavelengths between 633 and 1709 nm), zinc oxide ($n_o$ between 2.106 and 1.923 and $n_e$ between 2.123 and 1.937 for wavelengths between 450 and 1800 nm), alpha-zinc sulfide ($n_o$ between 2.705 and 2.285 and $n_e$ between 2.709 and 2.288 for wavelengths between 360 and 1400 nm), and beta-zinc sulfide ($n_o$ between 2.471 and 2.265 for wavelengths between 450 and 2000 nm). High refractive index organic phases are also preferred as particle scattering colorants for use in low refractive index phases. An example of a high refractive index organic phase that can be used as a particle scattering colorant with a low refractive index organic matrix phase (such as a polyfluoro-olefin) is a polycarbonate or a polystyrene. As is conventional, $n_o$ and $n_e$ in the above list of refractive indices denote the ordinary and extraordinary refractive indices, respectively, for crystals that are optically anisotropic. The $n_o$ refractive index is for light propagating down the principal axis, so there is no double refraction, and the $n_e$ refractive index is for light having a polarization that is along the principal axis.

For the case where a high refractive index matrix is needed in conjunction with low index scattering particles, preferred particle scattering colorants are 1) low refractive index materials, such as fluorinated linear polymers, fluorinated carbon tubules, fluorinated graphite, and fluorinated fullerene phases, 2) low refractive index particles such as cavities filled with air or other gases, and 3) low refractive index inorganic materials such as either crystalline or amorphous $MgF_2$. Various inorganic glasses, such as silicate glasses, are preferred for use as particle scattering colorants in many organic polymer matrices for the vanishing $\Delta n$ embodiments. The reason for this preference is that such glasses are inexpensive and can be conveniently formulated to match the refractive index of important, commercially available polymers at one wavelength in the visible. Also, the dispersion of refractive index for these glasses can be quite different from that of the polymers, so that substantial coloration effects can appear in particle scattering. Inorganic glasses are also preferred for use in high $\Delta n$ embodiments, although it should be clear that the host matrix chosen for a high $\Delta n$ embodiment for particular glass particles must have either a much higher or a much lower refractive index than the matrix chosen for a vanishing $\Delta n$ embodiment for the same glass particles. For example a glass having a refractive index of 1.592 would be a suitable particle scattering colorant for polystyrene in the vanishing $\Delta n$ embodiment, since polystyrene has about this refractive index. On the other hand, poly(heptafluorobutyl acrylate), with refractive index of 1.367 could be used with the same glass particles in a high $\Delta n$ embodiment. Relevant for constructing these colorant systems, note that the refractive indices of common glasses used in optical instruments range from about 1.46 to 1.96. For example, the refractive indices of ordinary crown, borosilicate crown, barium flint, and light barium flint extend from 1.5171 to 1.5741 and the refractive indices of the heavy flint glasses extend up to about 1.9626. The values of $n_f - n_c$ for these glasses with refractive indices between 1.5171 and 1.5741 range between 0.0082 and 0.0101. The corresponding range of the Abbe number is between 48.8 and 59.6. A refractive index that is on the lower end of the above range for commonly used optical glasses is obtained for fused quartz, and this material is also a preferred particle scattering colorant. The refractive index for fused quartz ranges from 1.4619 at 509 nm to 1.4564 at 656 nm.

Ferroelectric ceramics (such as the above mentioned barium titanate and solid solutions of $BaTiO_3$ with either $SrTiO_3$, $PbTiO_3$, $BaSnO_3$, $CaTiO_3$, or $BaZrO_3$) are preferred compositions for the particle scattering colorant phase of the compositions of the present invention. The reason for this preference is two-fold. First, very high refractive indices are obtainable for many such compositions. For high $\Delta n$ embodiments, these high refractive indices can dramatically enhance coloration via an enhancement in scattering due to the large refractive index difference with respect to that of the matrix phase. Second, if matrix and host phases are matched in refractive index at a particular wavelength in the absence of an applied field (as for the vanishing $\Delta n$ embodiments), an applied electric field can change the wavelength at which this match occurs—thereby providing a switching of color state. Alternatively, a ferroelectric phase that is an organic polymer can be selected to be the host phase. If a particle phase is again selected to match the refractive index of the unpoled ferroelectric at a particular wavelength, the poling process can introduce an electrically switched change in coloration, Such matching of the refractive index of host phase and particle scattering colorant can be one that exists only for a specified direction of light polarization. However, it is most preferred that the matrix material and the particle scattering colorant have little optical anisotropy, so that the match of refractive indices is largely independent of light polarization direction.

Ceramics that are relaxor ferroelectrics are preferred ferroelectrics for use as particle scattering colorant phases. These relaxor ferroelectrics have a highly diffuse transition between ferroelectric and paraelectric states. This transition is characterized by a temperature $T_m$, which is the temperature of the frequency-dependent peak in dielectric constant. As is conventional, we herein call $T_m$ the Curie temperature ($T_c$) of a relaxor ferroelectric, even though such ferroelectrics do not have a single transition temperature from a purely ferroelectric state to a purely paraelectric state. Relaxor ferroelectrics are preferred ferroelectrics for use as particle scattering colorants when electric-field-induced switching in coloration is desired, since such compositions can display very large field-induced changes in refractive indices. Since these field-induced refractive index changes generally decrease as particle diameters become small, the particle dimensions should be selected to be as large as is consistent with achieving desired coloration states.

Relaxor ferroelectrics that are preferred for the present invention have the lead titanate type of structure ($PbTiO_3$) and disorder on either the Pb-type of sites (called A sites) or the Ti-type of sites (called B sites). Examples of such relaxor ferroelectrics having B site compositional disorder are $Pb(Mg_{1/3}Nb_{2/3})O_3$ (called PMN), $Pb(Zn_{2/3})O_3$ (called PZN), $Pb(Ni_{1/3}Nb_{2/3})O_3$ (called PNN), $Pb(Sc_{1/2}Ta_{1/2}O_3$, $Pb(Sc_{1/2}Nb_{1/2})O_3$ (called PSN), $Pb(Fe_{1/2}Nb_{1/2})O_3$ (called PFN), and $Pb(Fe_{1/2}Ta_{1/2}O_3$. These are of the form $A(BF_{1/3}BG_{2/3})O_3$ and $A(BF_{1/2}BG_{1/2})O_3$ where BF and BG represent the atom types on the B sites. Further examples of relaxor ferroelectrics with B-site disorder are solid solutions of the above compositions, such as $(1-x)Pb(Mg_{1/3}Nb_{2/3})O_3$-$xPbTiO_3$ and $(1-x)Pb(Zn_{1/3}Nb_{2/3})O_3$-$xPbTiO_3$. Another more complicated relaxor ferroelectric that is preferred for the present invention is $Pb_{1-x}^{2-}La_x^{3+}(Zr_yTi_z)_{1-x/4}O_3$ which is called PLZT.

PZT (lead zirconate titanate, $PbZr_{1-x}Ti_xO_3$) is an especially preferred ferroelectric ceramic for use as a particle scattering colorant. PMN (lead magnesium niobate, $Pb(Mg_{1/3}Nb_{2/3})O_3$) is another especially preferred material, which becomes ferroelectric below room temperature. Ceramic compositions obtained by the addition of up to 35 mole percent $PbTiO_3$ (PT) to PMN are also especially preferred for use as a particle scattering colorant, since the addition of PT to PMN provides a method for varying properties (such as increasing the Curie transition temperature and varying the refractive indices) and since a relaxor ferroelectric state is obtainable using up to 35 mole percent of added (i.e., alloyed) PT.

Ceramic compositions that undergo a field-induced phase transition from the antiferroelectric to the ferroelectric state are also preferred for obtaining composites that undergo electric-field-induced switching of coloration. One preferred family is the $Pb_{0.97}La_{0.02}(Zr, Ti, Sn)O_3$ family that has been found by Brooks et al. (Journal of Applied Physics 75, pp. 1699–1704 (1994)) to undergo the antiferroelectric to ferroelectric transition at fields as low as 0.027 MV/cm. Another family of such compositions is lead zirconate-based antiferroelectrics that have been described by Oh et al. in "Piezoelectricity in the Field-Induced Ferroelectric Phase of Lead Zirconate-Based Antiferroelectrics", J. American Ceramics Society 75, pp. 795–799 (1992) and by Furuta et al. in "Shape Memory Ceramics and Their Applications to Latching Relays", Sensors and Materials 3,4,pp. 205–215 (1992). Examples of known compositions of this type, referred to as the PNZST family, are of the general form $Pb_{0.99}Nb_{0.02}[(Zr_{0.6}Sn_{0.4})_{1-y}Ti_y]_{0.98}O_3$. Compositions included within this family display field-induced ferroelectric behavior that is maintained even after the poling field is removed. Such behavior is not observed for Type I material (y=0.060), where the ferroelectric state reconverts to the antiferroelectric state when the field is removed. However, type II material (y=0.63) maintains the ferroelectric state until a small reverse field is applied and the type III material (y=0.065) does not revert to the antiferroelectric state until thermally annealed at above 50° C.

Reflecting these property differences, the type I material can be used for articles that change coloration when an electric field is applied, and revert to the initial color state when this field is removed. On the other hand, the type II and type III materials can be used to provide materials in which the electric-field-switched color state is stable until either a field in the reverse direction is applied or the material is thermally annealed.

Ferroelectric polymer compositions are suitable for providing either the particle scattering colorant or the matrix material for a composite that is electrically switchable from one color state to another. The term ferroelectric polymer as used herein includes both homopolymers and all categories of copolymers, such as random copolymers and various types of block copolymers. This term also includes various physical and chemical mixtures of polymers. Poly (vinylidene fluoride) copolymers, such as poly(vinylidene fluoride-trifluoroethylene), P(VDF-TrFE), are preferred ferroelectric polymer compositions. Additional copolymers of vinylidene fluoride that are useful for the composites of the present invention are described by Tournut in Macromolecular Symposium 82, pp. 99–109 (1994). Other preferred ferroelectric polymer compositions are the copolymers of vinylidene cyanide and vinyl acetate (especially the equal mole ratio copolymer) and odd nylons, such as nylon 11, nylon 9, nylon 7, nylon 5, nylon 3 and copolymers thereof.

Other particle scattering colorants include those that are absorbing particle scattering colorants. One preferred family of such absorbing particle scattering colorants are colloidal particles of metals (such as gold, silver, platinum, palladium, lead, copper, tin, zinc, nickel, aluminum, iron, rhodium, osmium, iridium, and alloys, metal oxides such as copper oxide, and metal salts). Preferably the particles are less than about 0.5 micron in average dimension. More preferably the particles are less than about 0.1 microns in average dimension. In order to achieve special coloration effects, particles are most preferred that are less than about 0.02 microns in average dimension. Particles that have colloid-like dimensions are herein referred to as colloidal particles, whether or not colloid solutions can be formed. Particle sizes that are below about 0.02 microns are especially useful for obtaining a wide range of coloration effects from one composition of absorbing particle scattering colorant, since these small sizes can provide particle refractive indices and absorption coefficient maxima that depend upon particle size. This size variation of the wavelength dependent refractive index and absorption coefficient is most strongly enhanced for particles that are sometimes referred to as quantum dots. Such quantum dot particles preferably have a narrow particle size distribution and an average particle size that is from about 0.002 to about 0.010 microns.

Convenient methods for forming colloidal particles include the various methods well known in the art, such as reaction of a metal salt in a solution or the crystallization of materials in confined spaces, such as solid matrices or vesicles. Likewise, well-known methods for producing colloidal particles can be employed wherein colloid size liquid or solid particles dispersed in a gas or a vacuum are either reacted or otherwise transformed into solid particles of desired composition, such as by crystallization. As an example of formation of colloidal particles that are useful for the present invention by solution reaction methods, note that Q. Yitai et al. have described (in Materials Research Bulletin 30, pp. 601–605 (1995)) the production of 0.006 micron diameter zinc sulfide particles having a very narrow particle distribution by the hydrothermal treatment of mixed sodium sulfide and zinc acetate solutions. Also, D. Daichuan et al. have reported (in Materials Research Bulletin 30, pp. 537–541 (1995)) the production of uniform dimension colloidal particles of β-FeO(OH) by the hydrolysis of ferric salts in the presence of urea using microwave heating. These particles had a rod-like shape and a narrow size distribution. Using a similar method (that is described in Materials Research Bulletin 30, pp. 531–535 (1995)), these authors have made colloidal particles of α-FeO having a uniform shape (and dimensions) that can be varied from a tetragonal shape to close to spherical (with an average particle diameter of about 0.075 microns).

Fiber-like particle scattering colorants having a colloid-like size in at least two dimensions are also preferred for certain invention embodiments, especially where anisotropic coloration effects are desired. One unusual method for forming very small fibers that can be used as particle scattering colorants is by the deposition of a material within the confining space of a hollow nano-scale fiber. The particle scattering colorant can then either comprise the filled nano-scale diameter fiber, or the fiber of the filler that is obtained by removing (by either physical or chemical means) the sheath provided by the original hollow fiber. The general approach of making such fibers by the filling of nano-size hollow fibers is taught, for example, by V. V. Poborchii et al. in Superlattices and Microstructures, Vol. 16, No. 2, pp.133–135 (1994). These workers showed that about 6 nm diameter nano-fibers can be obtained by the injection and subsequent crystallization of molten gallium arsenide within the 2 to 10 nm channels that are present in fibers of chrysotile asbestos. An advantage of such small dimension particles, whether in fiber form or not, is that the quantum mechanical effects provide refractive indices and electronic transition energies that strongly depend upon particle size. Hence, various different coloration effects can be achieved for a particle scattering colorant by varying particle size.

Also, high dichroism in the visible can be obtained for colloidal fibers of metals and semiconductors, and such high dichroism can result in novel visual appearances for articles that incorporate such fibers as particle scattering colorants.

Colloidal particle scattering colorants, as well as particle scattering colorants that have larger dimensions, that comprise an outer layer that absorbs in the visible are among preferred particle scattering colorants for use in high $\Delta n$ embodiments. In such high $\Delta n$ embodiments there is a large refractive index difference between the particle scattering colorant and the matrix in the visible wavelength range. The reason for this preference is that a very thin layer of a visible-light-absorbing colorant on the outside of a colorless particle scattering colorant can dramatically enhance scattering at the particle-matrix interface, while not substantially increasing light absorption. In order to achieve the benefits of such particle scattering colorant configuration, it is preferred that (1) the coating of the visible-light-absorbing colorant on the surface of the particle scattering colorant comprises on average less than 50% of the total volume of the particles of the particle scattering colorant, (2) the average particle size of the particle scattering colorant is less that 2 microns, and (3) the refractive index of the coating of the particle scattering colorant differs from that of the matrix in which the particle scattering particle is dispersed by at least 10% at visible wavelengths. More preferably, the coating of the visible-light-absorbing colorant on the surface of the particle scattering colorant comprises on average less than about 20% of the total volume of the particles of the particle scattering colorant and the average particle size of the particle scattering colorant is less that 0.2 microns. Preferred applications of such surface-enhanced particle scattering colorants are for polymer fibers, polymer films, and polymer molded articles. A method for the fabrication of colloidal particles containing a visible-light-absorbing colorant on the surface of a colorless substrate particle is described by L. M. Gan et al. in Materials Chemistry and Physics 40, pp. 94–98 (1995). These authors synthesized barium sulfate particles coated with a conducting polyaniline using an inverse microemulsion technique. The sizes of the composite particles (from about 0.01 to 0.02 microns) are convenient for the practice of the high $\Delta n$ embodiments of the present invention.

Colloid particles can either be added to the matrix in the colloid-form or the colloid particles can be formed after addition to the matrix. Likewise, these processes of colloid formation and dispersion can be accomplished for a precursor for the matrix, which is subsequently converted to the matrix composition by chemical processes, such as polymerization. For example, if the matrix is an organic polymer, such as nylon, the metal colloids can be formed in a liquid, mixed with the ground polymer, and heated above the melting point of the polymer to produce nylon colored with particle scattering colorants. On the other hand, either colloidal metal particles or a precursor thereof can be added to the monomer of the polymer, the colloid particles can be formed in the monomer, and the monomer can then be polymerized. A precursor for a metal colloid can also be added to the polymer matrix and the colloidal particles can be then formed in a subsequent step. Such processes of colloidal particle formation and incorporation can be facilitated by using a melt, dissolved, gel, or solvent-swollen state of the polymer (or a precursor thereof) during colloid incorporation, colloid formation, or colloid formation and incorporation. Alternatively, high energy mechanical commingling involving a solid state of the polymer (or a precursor thereof) can be used to accomplish colloid incorporation, colloid formation, or colloid formation and incorporation.

The incorporation of colloidal size particle scattering colorants in the gel state of a polymer prior to the formation of said gel state into a polymer fiber provides a preferred embodiment of this invention. For such process, the particle scattering colorant should preferably have a refractive index that is at least 10% different from that of the solid polymer matrix of the fiber at a wavelength in the visible. The average particle size of the particle scattering colorant is preferably less than about 0.2 microns, more preferably less than about 0.08 microns, and most preferably less than about 0.02 microns. For particle sizes of less than about 0.02 microns, the particle scattering colorants preferably significantly absorbs in the visible. For the case where the particle scattering colorant is substantially non-absorbing in the visible, the polymer fiber preferably comprises an electronic transition colorant that is commingled with the particle scattering colorant in the gel state. Preferably this electronic transition colorant is substantially a black carbon form, such as carbon black, and the particle scattering colorant comprises an inorganic composition. So as not to interfere with fiber strength, both the particle scattering colorant and optional electronic transition colorant particle used for these fibers should have very small dimensions, preferably less than about 0.02 microns. Such invention embodiments solve a long standing problem that arises for the coloration of high strength fibers that are spun in the gel state, such as high molecular weight polyethylene that is spun from a mineral oil gel. This problem is that conventional organic dyes or pigments can interfere with the formation of high quality product from the gel state. An important example of a high strength fiber product spun from the gel state is Spectra™ polyethylene fiber made by AlliedSignal. These fibers, which are gel processed at high temperatures, are widely used for fishing lines, fishing nets, sails, ropes, and harnesses. The absence of satisfactory prior methods for achieving coloration has been a problem in the art.

Ultrafine metal particles suitable for use as particle scattering colorants can be located on the surface of much larger particles that are themselves particle scattering colorants. Combined-particle scattering colorants of this form are also suitable for the present invention. Methods for the preparation of such particle scattering colorants, where metal particles are deposited on much larger polymer particles, are provided by H. Tamai et. al. in the Journal of Applied Physics 56, pp. 441–449 (1995). As another alternative, colloidal particle scattering colorants can be located within larger particles that, depending upon their dimensions and refractive index in the visible (relative to the matrix) can additionally provide particle scattering coloration. In any case, the larger particles are referred to as particle scattering colorants as long as the included particles are particle scattering colorants. In a preferred case, the colloidal particles are metal or metal alloy particles in a glass matrix. Methods for obtaining colloidal copper dispersed in $SiO_2$-comprising glass are described in the Journal of Non-crystalline Solids 120, pp. 199–206 (1990) and methods for obtaining silicate glasses containing colloidal particles of various metals, including gold and silver, are described in U.S. Pat. Nos. 2,515,936, 2,515,943, and 2,651,145, which are incorporated herein by reference. These glasses containing colloidal particle scattering colorants are transformed to particles, such as by grinding of melt processes, and used as particle scattering colorants in embodiments of this invention. In such embodiments, these particle scattering colorants are preferably dispersed in a polymer matrix, thereby providing particle scattering coloration for articles consisting of the resulting polymer composite.

An advantage of this colloid-within-particle design of the particle scattering colorant is that the glass particles can stabilize the colloidal particles with respect to degradation processes, such as oxidation. A second advantage is that high temperature methods can be used for forming the colloid in the glass, which could not be used for the dispersion of the colloidal particles directly in an organic polymer matrix. A third advantage of the colloid-within-particle method is that the processes of colloid formation and dispersion are separated from the processes of dispersion of the particle scattering colorant in the final polymer matrix, which can provide improved process economics. As an alternative to the melt synthesis of colloid-within-particle particle scattering colorants, such colorants can be synthesized by a method used by K. J. Burham et al., which is described in Nanostructure Materials 5, pp. 155–169 (1995). These authors incorporated colloidal particles in silica by doping metal salts in the silanes used for the sol-gel synthesis of the silicate. By such m-means they obtained Ag, Cu, Pt, Os, $Co_3C$, $Fe_3P$, $Ni_2P$, or Ge colloidal particles dispersed in the silica. For the purposes of the present invention embodiment, colloidal particles dispersed in silica can be ground into suitable particle sizes for use as particle scatter fin colorants.

Instead of an inorganic glass, the particle containing the colloid particles can be a polymer. It is known in the art to prepare films of colloidal dispersions of various metals in the presence of vinyl polymers with polar groups, such as poly(vinyl alcohol), polyvinylpyrrolidone, and poly(methyl vinyl ether). Particle scattering colorants suitable for the present invention embodiment can be obtained by cutting or grinding (prefer ably at low temperatures) a polymer film formed by solvent evaporation of the colloidal dispersion. More preferably, such particle scattering colorants can be formed by eliminating the solvent from an aerosol comprising colloidal particles dispersed in a polymer-containing solvent. Particle scattering colorants th at are either semiconductors or metallic conductors are among preferred compositions for use in polymer fibers. Such particle scattering colorants will generally provide significant absorption at visible wavelengths. In such case it is preferred that the particle scattering colorant has an average diameter in the smallest dimension of less than about 2 microns, the $n_e$ at polymer matrix is substantially non-absorbing in the visible, and the minimum in transmitted visible light intensity for the particle scattering colorant is shifted by at least by about 10 nm as a result of the finite particle size of the particle scattering colorant. More preferably, this shift is at least about 20 nm for the chosen particle sizes of the particle scattering colorant and the chosen matrix material. For assessing the effect of particle size on the minimum of transmitted light intensity, a particle size above about 20 microns provides a good approximation to the infinite particle size limit.

For particle scattering colorant compositions that provide a single maximum in absorption coefficient within the visible range when particle sizes are large, another application of the standard transmitted light intensity ratio enables the identification of preferred particle scattering colorants. This method is to identify those particle scattering colorants that have at least two minima in transmitted light intensity ratio that occur within the visible wavelength range. Such two minima, possibly in addition to other minima, can result from either a bimodal distribution of particle sizes, or differences in the minimum resulting from absorptive processes and scattering processes for a mononodal distribution of particle sizes. If the particle scattering colorants are required for applications in which switchability in coloration states are required, it is preferable that these two minima arise for a mononodal distribution in particle sizes. The reason for this preference is that the switchability in the refractive index difference between matrix and particle scattering colorant can provide switchable coloration if particle scattering effects are dominant. Mononodal and bimodal particle distributions, referred to above, designate weight-fraction particle distributions that have one or two peaks, respectively.

For applications in which reversible color changes in response to temperature changes are desired, particular ceramics that undergo reversible electronic phase changes are preferred particle scattering colorants for the present invention. Such compositions that undergo reversible transitions to highly conducting states upon increasing temperature are $VO_2$, $V_2O_3$, NiS, $NbO_2$, $FeSi_2$, $Fe_3O_4$, $NbO_2$, $Ti_2O_3$, $Ti_4O_7$, $Ti_5O_9$, and $V_{1-x}M_xO_2$, where M is a dopant that decreases the transition temperature from that of $VO_2$ (such as W, Mo, Ta, or Nb) and where x is much smaller than unity. $VO_2$ is an especially preferred color-changing particle additive, since it undergoes dramatic changes in both the real and imaginary components of refractive index at a particularly convenient temperature (about 68° C.). The synthesis and electronic properties of these inorganic phases are described by Speck et al. in Thin Solid Films 165, 317–322 (1988) and by Jorgenson and Lee in Solar Energy Materials 14, 205–214 (1986).

Because of stability and broad-band ability to absorb light, various forms of aromatic carbon are preferred electronic transition colorants for use in enhancing the coloration effects of particle scattering colorants. Such preferred compositions include various carbon blacks, such as channel blacks, furnace blacks, bone black, and lamp black. Depending upon the coloration effects desired from the combined effects of the particle scattering colorant and the electronic colorant, various other inorganic and organic colorants that are conventionally used by the pigment and dye industry are also useful. Some examples of such inorganic pigments are iron oxides, chromium oxides, lead chromates, ferric ammonium ferrocyanide, chrome green, ultramarine blue, and cadmium pigments. Some examples of suitable organic pigments are azo pigments, phthalocyanine blue and green pigments, quinacridone pigments, dioxazine pigments, isoindolinone pigments, and vat pigments.

The use of either electronic transition colorants that are dichroic or a dichroic matrix composition can be used to provide novel appearances. Such novel appearances can result, for example, since the scattering of particle scattering colorants can display a degree of polarization. Preferential orientation of the dichroic axis is preferred, preferably either parallel or perpendicular to the fiber axis for a fiber or in the film plane for a film, and can be conveniently achieved by conventionally employed methods used to make polarizers, such as mechanical drawing. The dichroic behavior can be usefully developed either in the same matrix component in which the particle scattering colorant is dispersed or in a different matrix component. One preferred method for providing dichroic polymer matrix materials for the large Δn embodiments is by incorporating a dye molecule in the polymer, followed by uniaxially stretching the matrix containing the dye molecule. Such a dye molecule serves as a dichroic electronic absorption colorant. The effect of the mechanical stretching process is to preferentially orientate the optical transition axis of the dye molecule with respect to the stretch axis of the polymer. The creation of polarizing films by the mechanical stretching of a polymer host matrix is described by Y. Direx et al. in Macromolecules 28, pp. 486–491 (1995). In the example provided by these authors, the dye was sudan red and the host matrix was polyethylene. However, various other combinations of dye molecules and polymer matrices are suitable for achieving the polarizing effect that can be usefully employed in the particle scattering colorant composites of the present invention embodiments.

Various chemical compositions that are capable of providing switchability in refractive index or adsorption coefficients are useful for either host matrices, particle scattering colorants, or electronic transition colorants that enhance the effects of scattering particle colorants. In order to achieve novel coloration effects that are anisotropic, all of these switchable chemical compositions that are anisotropic can optionally be incorporated in a preferentially orientated manner in fabricated articles. By providing refractive index and electronic transition changes that occur as a function of thermal exposure, light exposure, or humidity changes, such materials (either with or without preferential orientation) provide a switchable coloration state. A host of such color-changing chemicals suitable for the present invention are well known, such as the anils, fulgides, spiropyrans, and other photochromic organics described in the book by A. V. El'tsov entitled "Organic Photochromes" (Consultants Bureau, New York, 1990). Such color changing chemicals can be employed as electronic transition colorants that modify the visual effect of particle scattering colorants in polymer composites. Also, color changes in response to temperature, light exposure, or humidity can alternatively be produced by using the many well-known materials that provide refractive index changes in response to these influences, and no significant change in absorption coefficients at visible light wavelengths. Such materials can be used as either the matrix material or the particle scattering colorants for the color changing composites.

A host of photopolymerizable monomers, photo-dopable polymers, photo-degradable polymers, and photo cross-linkable polymers are also available for providing the switchable refractive indices and switchable electronic absorption characteristics that enable the construction of articles having switchable particle scattering coloration. Materials suitable for this use are described, for example, in Chapter 1 (pages 1–32) written by J. E. Lai in the book entitled "Polymers for Electronic Applications", which is also edited by the same author (CRC Press, Boco Raton Fla., 1989). Improved materials that are now being introduced are described by G. M. Wallraff et al. in CHEMTECH, pp. 22–30, April 1993. More exotic compositions suitable for the present application are described by M. S. A. Abdou, G. A. Diaz-Guijada, M. I. Arroyo, and S. Holdcroft in Chem. Mater. 3, pp. 1003–1006 (1991).

Polymer colored articles of the present technology can also contain fillers, processing aids, antistats, antioxidants, antiozonants, stabilizers, lubricants, mold release agents, antifoggers, plasticizers, and other additives standard in the art. Unless such additives additionally serve desired purposes as particle scattering colorants or electronic transition colorants, such additives should preferably either dissolve uniformly in the polymer that contains the particle scattering colorant or such additives should have a degree of transparency and a refractive index similar to the matrix polymer. Dispersing agents such as surfactants are especially useful in the present invention for dispersing the particle scattering colorant particles. Many suitable dispersing agents and other polymer additives are well known in the art and are described in volumes such as "Additives for Plastics", edition 1, editors J. Thuen and N. Mehlberg (D.A.T.A., Inc., 1987). Coupling agents that improve the coupling between particle scattering particles and host matrix are especially important additives for vanishing $\Delta n$ embodiments, since they can eliminate fissure formation or poor wetting at particle-matrix interfaces. For cases where either a glass or a ceramic is the particle scattering colorant, and the host matrix is an organic polymer, preferred coupling agents are various silanes that are commercially available and designed to improve bonding in composites that involve both inorganic and organic phases. Examples of suitable coupling agents for particle scattering colorant composites of this type are 7169–45B and X1–6124 from Dow Corning Company.

The colored articles of the present invention can optionally contain materials that are either fluorescent or phosphorescent. An example of such known materials are of the form $Zn_{1-x}Cd_xS$, where x is no greater than unity, that contains Cu, Ag, or Mn impurities.

In various teachings of this invention we refer to photopolymerizable monomers and oligomers. Examples of such compositions that are suitable for the practice of invention embodiments are monomers containing two of more conjugated diacetylene groups (that are polymerizable in the solid state), vinyl ether terminated esters, vinyl ether terminated urethanes, vinyl ether terminated ethers, vinyl ether terminated functionalized siloxanes, various diolefins, various epoxies, various acrylates, and hybrid systems involving mixtures of the above. Various photoinitiators are also useful for such systems, such as triarylsulfonium salts.

Various methods can be employed for the compounding and fabrication of the composites of the present invention. For example, particle scattering colorants can be compounded with polymeric matrix materials via (1) melt-phase dispersion, (2) solution-phase dispersion, (3) dispersion in a colloidal polymer suspension, or (4) dispersion in either a prepolymer or monomer for the polymer. Films of the composite can be either formed by solvent evaporation or by adding a non-solvent to a solution containing dispersed ceramic powder and dissolved polymer followed by sample filtration, drying, and hot pressing. In method (4), the ceramic particles can be dispersed in a monomer or prepolymer that is later thermally polymerized or polymerized using actinic radiation, such as ultraviolet, electron-beam, or X-ray radiation. Particle scattering colorants can also be combined with the matrix by xerographic, power coating, plasma deposition, and like methods that are well known in the art. For example, particle scattering colorants can be added to fabrics or carpet by using xerography techniques described in "Printing Textile Fabrics with Xerography" (W. W. Carr, F. L. Cook, W. R. Lanigan, M. E. Sikorski, and W. C. Tinche, Textile Chemist and Colorist, Vol. 23, no. 5, 1991). The coating of textile, carpet fiber, and wallpaper articles with particle scattering colorants in a fusible polymer matrix, so as to obtain coloration, is an especially important embodiment because of the commercial importance of speedy delivery of articles that accommodate frequent style and color changes and individual customer preferences. Such deposition can optionally be preceded by a separate deposition of an electronic transition colorant in order to enhance the effect of the particle scattering colorant.

In order to obtain uniform mixing of the ceramic in the host polymer, ultrasonic mixers can be used in the case of low viscosity composite precursor states and static mixers and more conventional mixers can be used for melt blending processes. Static mixers, which are particularly useful for melt blending processes, are available commercially from Kenics Corporation of Danvers, Mass., and are described by Chen and MacDonald in Chemical Engineering, March 19, 1973, pp. 105–110. Melt-phase compounding and melt-phase fabrication are preferred for the compositions of the present invention. Examples of useful melt-phase fabrication methods are hot rolling, extrusion, flat pressing, and injection molding. For the fabrication of the more complicated shapes, injection molding and extrusion are especially preferred.

In some cases it is desirable to achieve a degree of controlled aggregation of the particle scattering colorants in order to achieve anisotropy in coloration effects. Such aggregation to produce anisotropy in coloration is preferably in either one dimension or two dimensions, wherein the direction of such aggregation for different particle aggregates are correlated. Such correlation in aggregation is most conveniently achieved by plastic mechanical deformation of a matrix that is heavily loaded with the particle scattering colorant. For example, such mechanical deformation can be in the fiber direction for a fiber or in either one or both of two orthogonal directions in the film plane for a film. As an alternative to using particle aggregation to achieve anisotropy in coloration, anisotropy in particle shape can be used to achieve the similar effects. For example, mechanical deformation of films and fibers during processing will generally cause plate-like particles to preferentially orient with the plate plane orthogonal to the film plane and fiber-like particles to preferentially orient with the particle fiber axis parallel to the fiber axis of the composite.

A special type of particle scattering colorant orientation effect is specially useful for vanishing Δn embodiments. In such embodiments it is usually preferred that the particle scattering colorants and matrix materials are isotropic in optical properties. However, in order to obtain novel angle-dependent coloration effects, one can preferentially orient plate-like particles of an anisotropic particle scattering colorant in polymer films so that an optic axis of the particles is normal to the film plane. Such particles and polymer matrix are chosen so that the ordinary refractive index ($n_o$) of the particles equals that of the matrix at a wavelength in the visible. Hence, a film article will appear highly colored when light perpendicular to the film plane is transmitted through the film. However, light that is similarly viewed that is inclined to the film plane will be scattered at all wavelengths so the article will appear either uncolored or less intensely colored. In such embodiments the particle scattering colorant is chosen to be one that has the optic axis perpendicular to the particle plate plane, which is the case for many materials having either hexagonal, trigonal, or tetragonal symmetry. Preferential orientation of the plane of the plate-like particles parallel to the film plane can be obtained by various conventional processes, such as film rolling processes, film formation by solution deposition processes, and biaxial stretching processes. Note that such plate-like particle scattering colorants are quite different from the plate interference colorants of the prior art. For these prior art colorants, no match of refractive indices of matrix and particle is require, and, in fact, large refractive index differences between the particles and the matrix throughout the visible can increase the coloration effect.

Fibers of the present invention embodiments can either be formed by conventional spinning techniques or by melt fabrication of a film followed by cutting the film into either continuous fibers or staple. An electronic transition colorant can be optionally included in the composite film composition. Alternately, a polymer film containing the particle scattering colorant can be adhesively joined either to one side or to both sides of a polymer film that contains an electronic transition colorant. The adhesive tie layer between these polymer film layers can be any of those typically used for film lamination. However, it is preferable to employ the same matrix polymer for the joined films and to select the tie layer to have about the same refractive index as this matrix polymer. Alternately, the central film layer containing electronic transition colorant and the outer film layers containing the particle scattering colorant can be coextruded in a single step using well-known technologies of polymer film coextrusion. If the desired end product is a polymer fiber, these multilayer film assemblies can be subsequently cut into fiber form. Microslitter and winder equipment is available from Ito Seisakusho Co., Ltd (Japan) that is suitable for converting such film materials to continuous fibers. Particularly interesting visual effects can be obtained if these fibers are cut from a bilayer film that consists of a polymer film layer containing the particle scattering colorant on one side and a polymer film layer containing an electronic transition colorant on the opposite side. Such fibers that provide a different visual appearance for different viewing angles can be twisted in various applications, such as carpets and textiles, to generate a spatially colored material due to the appearance in one viewing angle of alternating segments with different coloration. One coloration effect is provided if the fiber side that is in closest view is the particle scattering colorant film layer and another coloration effect is provided if the side that is in closest view is the electronic transition colorant film layer. Such special coloration effects of cut film fibers are most visually noticeable if the cut film fiber strips have a width-to-thickness ratio of at least 5. Additionally, dimensional compatibility of such fiber for commingling with conventional polymer fibers in textile and carpet applications is increased if the cut film fibers have a denier that is less than 200. As an alternative to the slit-film process, either bilayer or multilayer fibers having these characteristics can be directly melt spun using a spinneret that is designed using available technology of spinnerets. This paragraph has emphasized the formation of fibers by the cutting of polymer films of this invention that provide particle scattering coloration effect. However, is should be emphasized that the films that have been described also provide important commercial opportunities as film products for application in diverse areas, from product packaging on one extreme to wallpaper on another.

Sheath-core fibers which are suitable for the invention are fibers comprising a sheath of a first composition and a core of a second composition. Either the sheath or the core can be organic, inorganic, or mixed inorganic and organic, independent of the composition of the other component. Preferably both the sheath and core of such fibers contain organic polymer compositions. Also, the particle scattering colorant is preferably located in the sheath and an electronic transition colorant is preferably located in the core. By choice of either sheath or core cross-sectional geometry that does not have circular cylindrical symmetry, it is possible to provide fibers that provide different colorations when viewed in different lateral directions. For example, the external sheath geometry can be a circular cylinder and the core can be an ellipse having a high aspect ratio. When viewed orthogonal to the fiber direction along the long axial direction of the ellipse, the effect of the electronic transition colorant can dominate coloration. On the other hand, a corresponding view along the short axis of the ellipse can provide a visual effect that is less influenced by the electronic transition colorant. More generally, in order to achieve such angle dependent visual effects the maximum ratio of orthogonal axial dimensions in cross-section for the outer surface of the sheath is preferably less than one-half of the corresponding ratio for the core. Alternatively, the sheath and core should preferably both have a maximum ratio of orthogonal axial dimensions in cross-section that exceeds two and the long-axis directions in cross-section of sheath and core should preferably be unaligned. Such fibers that provide a different visual appearance for different viewing angles can be twisted in various applications, such as carpets and textiles, to generate a spatially colored material whose appearance in one viewing angle is determined by alternating segments with different coloration.

The ability to change the coloration of sheath-core fibers by varying the relative cross-sections of sheath and core provides for the convenient fabrication of yarns that display interesting visual effects because of variations in the coloration of different fibers in the yarn. Such variation can be accomplished, for example, by varying the relative or absolute sizes of the sheath and cores, their relative shapes, and the relative orientation of the sheath and core cross-sections. For any of these cases, the said variation can be provided either along the length of individual fibers or for different fibers in a yarn. Preferably in these embodiments, the particle scattering colorant is in the fiber sheath and an electronic transition colorant is in the fiber core. Also, a yarn consisting of such fibers is preferably assembled directly after spinning from a multi-hole spinneret. Variation in the individual spinneret hole constructions, or variation in the feed pressures for the sheaths and cores for different fiber spinning holes, can permit the desired fiber-to-fiber variations in either sheath cross-section, the core cross-section, or both. Alternatively, variation in the coloration of individual fibers along their length can be achieved by convenient means. These means can, for example, be by varying as a function of spinning time either (1) either the sheath polymer feed pressure or the core polymer feed pressure or (2) the relative temperatures of the sheath and the core polymers at the spinneret. Of these methods, variation in coloration along the lengths of individual fibers is preferred, and such variations are preferably achieved by changing the relative feed pressures of the sheath and core fiber components. Such pressure variations are preferably accomplished simultaneously for the spinneret holes that are used to produce different fibers and such spinneret holes for different fibers are preferably substantially identical. Yarns are preferably formed from the fibers at close to the point of spinning, so that correlation in the location of like colors for different fibers is not lost. As a result of such preferred embodiment, the color variations of individual fibers are spatially correlated between fibers, so these color variations are most apparent in the yarn.

The fact that fiber coloration depends upon both the sheath/core ratio and mechanical draw processes when the particle scattering colorant is in the sheath and the electronic transition colorant is in the core provides important sensor applications. These sensor applications utilize the coloration changes resulting from fiber wear and other fiber damage processes, such as the crushing of fibers which can provide coloration by deforming the cross-sections of sheath and core, abrasion or fiber dissolution which can change the cross-section of the fiber sheath, and fiber stretching (which can change the cross-sections of sheath and core, provide particle scattering colorant aggregation, and increase both polymer chain orientation and fiber crystallinity). In any case, the basis for these color changes is generally a changing relative contribution from particle scattering colorant and electronic transition colorant to article coloration. Such sensors can provide valuable indication of damage in articles such as ropes, slings, and tire cord where the possibility of catastrophic failure and uncertainties in when such failure might occur lead to frequent article replacement. The sheath/core fibers of the present invention can be used either as a color-indicating minority or majority fiber in such articles.

Special methods of this invention can be used to obtain particle-induced coloration for fibers that are spun in hollow form. The particles that provide coloration via scattering can be dispersed in a suitable liquid, which subsequently fills the hollow fibers. Optional electronic transition colorants can be included in this liquid in order to enhance the coloration effect. This approach is enabled by using either a precursor fiber that is staple (i.e., short open-ended cut lengths) or to use hollow fibers that contain occasional micro holes, where the hollow fiber core breaks to the surface. The existence of these micro holes enables rapid filling of the fibers. Modest pressures of preferably less than 2000 psi can be used to facilitate rapid filling of the fibers. A low viscosity carrier fluid is preferably chosen as one that can be either photopolymerized or thermally polymerized after the filling process. As an alternative to this approach, the particle scattering colorant can be included in molten polymer from which the hollow fibers are melt spun. Then the polymerizable fluid that is drawn into the hollow fiber after spinning can include an electronic transition colorant for enhancing the coloration effect of the particle scattering colorant. Various modifications of these methods can be employed. For example, melt spun fibers can contain various combinations of particle scattering and electronic transition colorants, as can the fluid that is drawn into the hollow fibers. As another variation of these methods, hollow fibers spun from a melt that contain a particle scattering colorant can be coated on the interior walls with a material that absorbs part of the light that is not scattered by the particle scattering colorant. For example, such coating can be accomplished by drawing an oxidant-containing monomer solution for a conducting polymer, solution polymerizing the conducting polymer onto the interior walls of the hollow fibers, and then withdrawing the solution used for polymerization from the hollow fibers. The inner walls of hollow fibers are preferably colored with an electronic transition colorant using a solution dye process that requires thermal setting. For example, a dye solution can be imbibed into the hollow fibers by applying suitable pressure, any dye solution on the exterior surface of the fibers can be washed away, the dye coloration can be set by thermal treatment, and the dye solution contained within the fibers can be removed (such as by evaporation of an aqueous solution). As an alternative to thermal setting, the setting of the dye on the inner surface of the hollow fibers can be by either photochemical or heating effects of radiation, such as electron beam, ultraviolet, or infrared radiation. Such thermal or photoassisted setting of the dye can be accomplished in a patterned manner, thereby providing fibers that display the type of spatial coloration effects that are sought after for carpet and textile applications.

The same methods above described for obtaining internal wall dyeing of-hollow fibers can be used for the achievement of novel optical effects via deposition of particle scattering colorants on the inside of hollow fibers. These particle colorants are preferably deposited by imbibing a colloidal solution containing the particle scattering colorant into the hollow fibers and then evaporating the fluid that is the carrier for the colloidal particles. The liquid in which the colloidal particles are dispersed can optionally contain a material that forms a solid matrix for the colloidal particles after fluid components are eliminated. Such colloidal particle scattering colorants, whether deposited on the inner walls as a $n_o$at layer or as a dispersion in a matrix, can then be optionally coated with an electronic transition colorant by methods described above for coating the inner walls of hollow fibers that are not coated with particle scattering colorants. Note that the above described deposition of colloidal particles on the inside of hollow fibers can result in aggregation of these particles to the extent that they transform from particle scattering colorants to electronic transition colorants. Depending upon the coloration effect desired, this aggregation can be either desirable or undesirable.

In the following embodiment of this invention, particle scattering colorants are used in hollow fibers to produce photochromism. Such photochromism can be achieved using particle scattering colorants that are photoferroelectrics. Preferred photoferroelectrics for this application are, for example, $BaTiO_3$, $SbNbO_4$, $KNbO_3$, $LiNbO_3$, and such compositions with optional dopants such as iron. These and related compositions are described in Chapter 6 (pp. 85–114) of "Photoferroelectrics" by V. M. Fridkin (Springer-Verlag, Berlin, 1979). Photovoltages of the order $10^3$ to $10^5$ volts can be generated for photoferroelectrics, although it should be recognized that these photovoltages decrease as the particle size in the polarization direction decreases. The corresponding photo-generated electric fields can be used to reversibly produce aggregation (i.e., particle chaining) of photoferroelectric particles that are dispersed in a low conductivity liquid within the cavity of a hollow fiber. If these photoferroelectric particles have suitably small dimensions, aggregation and deagoregation processes will provide a photo-induced change in the visual appearance and coloration of the fiber. The electrical conductivity of the fluid can determine the rate of return of the coloration to the initial state after light exposure ceases, since this conductivity can lead to the compensation of the photo-induced charge separation that provides the photo-induced field. Methods described above can be used for the filling of the hollow fibers with the photoferroelectric-containing liquid, and such liquid can be sealed in the fibers by a variety of processes, such as by periodic closure of the hollow tubes using mechanical deformation. Articles consisting of these photochromic fibers can be used for various applications, such as clothing that automatically changes color upon light exposure.

In another invention embodiment, the particle scattering colorant is a photoferroelectric that is dispersed in a solid matrix that has the same refractive index as the photoferroelectric at some wavelength in the visible (either when the photoferroelectric is not exposed to light or after it has been exposed to light, or both). This embodiment uses the large refractive index changes that occur upon the exposure of a photoferroelectric to light, which shifts the wavelength at which refractive index matching occurs (or either causes or eliminates such refractive index matching), thereby causing a coloration change in response to light.

In previously discussed embodiments of this invention (for sheath-core fibers, trilayer and bilayers films and derived cut-film fibers, and hollow polymer fibers), the use of particle scattering colorants in a layer that is exterior to the layer containing an electronic transition colorant has been described. One described benefit is the novel coloration effects achieved. Another benefit of such configurations is particularly noteworthy. Specifically, particle scattering colorants that provide blue coloration also generally provide significant scattering in the ultraviolet region of the spectra that can cause the fading of many electronic transition colorants. Hence, this ultraviolet scattering can protect the underlying electronic transition colorants from fading due to ultraviolet light exposure.

Preferred embodiments result from the advantages of using a particle scattering colorant to provide ultraviolet light protection for ultraviolet-light sensitive fiber and film products. For articles in which the particle scattering colorant is dispersed in a first matrix material that is substantially exterior to a second matrix component comprising an electronic transition colorant (such as for above described hollow fibers, sheath-core fibers, and trilayer films and derived cut-film fibers) it is preferred that (1) the first matrix component and materials contained therein absorb less than about 90% of the total visible light that can be incident on the article from at least one possible viewing angle, (2) the absorption coefficient of the first matrix component and materials contained therein is less than about 50% of that of the second matrix component and materials contained therein at a wavelength in the visible, (3) and the particle scattering colorant is substantially non-absorbing in the visible. In addition, it is preferable that the first matrix component and materials contained therein either absorb or scatter more than about 50% of uniform radiation at the ultraviolet wavelength at which the second matrix component comprising the electronic dopant undergoes the maximum rate of color fading. The term uniform radiation means radiation that has the same intensity for all spherical angles about the sample. Uniform radiation conditions exist if there is the same radiation intensity for all possible viewing angles of the article. The average particle size that is most effective for decreasing the transmission of light through a matrix at a wavelength $\lambda_o$ is generally greater than about $\lambda_o/10$ and less than about $\lambda_o/2$. Hence, for maximum protection of an electronic transition colorant that most rapidly fades at $\lambda_o$, the average particle for the particle scattering colorant should preferably be from about $\lambda_o/2$ to about $\lambda/10$. Additionally, for this purpose the particle scattering colorant should preferably be approximately spherical (having an average ratio of maximum dimension to minimum dimension for individual particles of less than four) and there should be little dispersion in the sizes of different particles. Most preferably the average particle size for the particle scattering colorants used for ultraviolet light protection of electronic transition pigments should be from about 0.03 to about 0.1 microns. Particle scattering colorants that are especially preferred for conferring ultraviolet light protection for electronic transition colorants are titanium dioxide and zinc oxide.

Materials suitable for the present art include inorganic or organic materials that have any combination of organic, inorganic, or mixed organic and inorganic coatings. The only fundamental limitation on such a coating material is that it provides a degree of transparency in the visible spectral region if the entire surface of the article is covered with such a coating material. Preferred coating materials for application to film, fiber, or molded part surfaces are well-known materials that are called antireflection coating materials, since they minimize the reflectivity at exterior surfaces. Such antireflection coatings can enhance the visual effect of particle scatting colorants by decreasing the amount of polychromatically reflected light. Antireflection coatings can be provided by applying a coating to the surface of an article so that the refractive index of the coating is close to the square root of the refractive index of the surface of the article and the thickness of the coating is close to $\lambda/4$, where $\lambda$ is the approximate wavelength of light that is most problematic. For example, antireflection coatings can be obtained by well known means for polymers such as polycarbonate, polystyrene, and poly(methyl methacrylate) by fluorination of the surface, plasma deposition of fluorocarbon polymers on the surface, coating of the surface with a fluoropolymer from solution, or in situ polymerization of a fluoromonomer that has been impregnated on the surface. Even when the refractive index of the antireflection polymer layer does not closely equal the square root of the refractive index of the surface of the article, light is incident at an oblique angle to the surface, and the wavelength of the light substantially deviates from λ, antireflection properties suitable for the present application can be obtained using such single layers. Furthermore, the known technologies of broadband, multilayer antireflection coatings can be used to provide antireflection coatings having improved performance. Hence, antireflection coatings can be provided for essentially any substrate, such as a polymer film, that decrease the polychromatic surface reflection that can interfere with the visual effect of particle scattering colorants.

The ability to arrange the light scattering particles in a patterned manner is important for achieving the spatial coloration that is desirable for many articles, such as polymer fibers. A number of processes can be used to achieve such spatial coloration. One method is to use the effect of magnetic fields on ordering magnetic colloidal fluids, such fluids being transformable into solid materials by thermal or photochemical setting. Such thermal setting is preferably either by decreasing temperature to below a glass transition or melting temperature or by thermal polymerization. Such photochemical setting is preferably by photo-polymerization to a glassy state. Another useful setting process is solvent evaporation from the colloidal suspension. Such setting should be substantially accomplished while the magnetic material is in a magnetic-field-ordered state, so that novel optical properties are conferred on the article by scattering and absorptive effects of the ordered magnetic material. Examples of magnetic colloidal suspensions that can be used to provide novel coloration effects are either water-based or organic-based suspensions of nanoscale magnetic oxides. Such suspensions, called ferrofluids, are obtainable commercially from Ferrofluidics Corporation, Nashua New Hampshire and are described by K. Raj and R. Moskowitz in the Journal of Magnetism and Magnetic Materials, Vol. 85, pp. 233–245 (1990). One example of how magnetic particles can be deposited in a spatially variant way is indicated by returning to the above examples of hollow fibers. Such hollow fibers can be filled with a dispersion of the magnetic particles in a polymerizable fluid. The magnetic particles can be spatially distributed in a desired pattern along the length of the hollow fibers using a magnetic field. Finally, the fluid can be polymerized or crosslinked thermally or by exposure to actinic radiation in order to set the structure. Polyurethane thermosets provide one preferred type of thermally set fluid for this application.

Spatially variant coloration of fibers and films can be accomplished quite simply by mechanical drawing processes that vary along the length of the fiber or film. Variation in the degree of draw can provide variation in the refractive index of the polymer matrix and the degree of stretch-induced crystallinity. These variations provide spatially dependent variation in the coloration resulting from particle scattering colorants. For such spatially dependent variation of coloration to be visually perceived, predominant color changes should occur less frequently than every 200 microns, unless the separation between regions having different optical properties is sufficiently short to provide diffraction grating or holographic-like effects.

Especially interesting and attractive visual effects can be achieved by the deposition of particle scattering colorants as a pattern that is spatially variant on the scale of the wavelength of light. The result of such pattering is the creation of a holographic-like effect. The preferred particle scattering colorants of the present invention embodiment have refractive indices for all wavelengths in the visible spectra which do not equal those of the host matrix at the same wavelength, which is in contrast with the case of Christiansen filters. In fact, it is preferable that the particle scattering colorants that are patterned to provide the holographic effect differ from that of the matrix by at least about 10% throughout the visible region. Most preferably, this difference in refractive index of particle scattering colorant and host matrix is at least about 20% throughout the visible region of the spectra.

The effect of the particle scattering colorants on the coloration of polymer articles and the polymers contained therein can be dramatically decreased or even eliminated, which is an important advantage of the present technology—since it enables the recycling of originally colored polymers to provide polymer resin that has little or no coloration. Special embodiments of the present invention enable such recycling. In the first embodiment both particle scattering colorants and electronic transition colorants are employed in different matrix polymers, so that the coloration effect of the particle scattering colorant is substantial only in the presence of the electronic transition colorant (which absorbs non-scattered light so that this light does not interfere with the visual effect of light that is chromatically scattered by the particle scattering colorant). In this embodiment, the scattering colorant has no significant absorption in the visible (or at least no significant absorption peak in the visible) and the matrix polymer for the particle scattering colorant and electronic transition colorant are sufficiently different that separation by physical or chemical means is viable. For example, this separation can be accomplished by either dissolving only one of the matrix polymers or causing the matrix polymer for the electronic transition colorant to depolymerize. The second embodiment employs colored articles that preferably contain only a particle scattering colorant. In this type of recycling method the coloration of the polymer is either decreased or eliminated by either (1) a thermal heating or irradiation process that either decreases the refractive index difference between particle scattering colorant and the host matrix to a value that is small, but either non-zero anywhere in the visible range or substantially zero throughout all the visible range; (2) a thermal heating or irradiation process that either eliminates a match of refractive index between matrix and particle scattering colorant at a wavelength in the visible or causes such match to occur over a broad spectral range; or (3) either a dissolution, evaporation, or chemical process that removes the particle scattering colorant from the host matrix. For example, the particle scattering colorant can be an organic composition that evidences a high refractive index with respect to the matrix because of the presence of double bonds. Chemical processes (such as ultraviolet-induced, four-centered coupling of double bonds to form cyclobutane rings) can dramatically decrease the refractive index difference of the particles and the matrix, thereby effectively eliminating the coloration. As another example, the particle scattering colorant can be chosen as one that is sublimable at temperatures at which the matrix polymer is thermally stable, one that is soluble in solvents that are non-solvents for the matrix polymer, or one that dissolves in the matrix polymer. In all of these cases, the coloration of the polymer is either decreased or eliminated by either destroying the particles, decreasing the refractive index difference between the particles and the matrix, eliminating a perfect match of refractive indices of the particles and the matrix at only one wavelength, or separating the particles from the matrix polymer. In fact, methods above described for obtaining switchable coloration of polymers (via refractive index changes), which are useful for obtaining spatial coloration effects in polymer articles, are also useful for either decreasing or eliminating coloration during recycling processes. A third embodiment of this invention for providing recyclable colored polymers uses mechanical processes, such as polymer grinding, that cause either aggregation or stress-induced chemical reaction of the particle scattering colorant, thereby eliminating the effectiveness of the particle scattering colorants for providing coloration.

The particle scattering colorant embodiments of the present invention that are described above do not necessarily require the arrangement of the individual particles as an array having translational periodicity. Such arrangement is sometimes desirable, since novel visual appearances can result, especially intense iridescent coloration. The problem is that it has been so far impossible to achieve such periodic arrangements in either the desired two or three dimensions on a time scale that is consistent with polymer processing requirements, which are dictated by economics. The presently described invention embodiment provides an economically attractive method to achieve these novel visual effects for polymers. The particle scattering colorants of this embodiment consist of primary particles that are arranged in a translationally periodic fashion in m dimensions, where m is either 2 or 3. At least one translational periodicity of the particle scattering colorants is preferably similar to the wavelength of light in the visible spectrum. More specifically, this preferred translational periodicity is from about 50 to about 2000 nm. More preferably this translational periodicity is from about 100 to about 1000 nm. In order to obtain such translational periodicity, it is desirable for the particle scattering colorant to consist of primary particles that have substantially uniform sizes in at least m dimensions. The particle scattering colorant can optionally comprise other primary particles, with the constraint that these other primary particles are either small compared with the above said primary particles or such other primary particles also have relatively uniform sizes in at least the said m dimensions. The average size of the primary particles in their smallest dimension is preferably less than about 500 nm.

The first step in the process is the preparation of translationally ordered aggregates of the primary particles. Since this first step does not necessarily occur on the manufacturing lines for polymer articles, such as fibers, films, or molded parts, the productivity of such manufacturing lines n$_e$ed not be reduced by the time required for the formation of particle scattering colorants consisting of translationally periodic primary particles. The second step in the process is to commingle the particle scattering colorant with either the polymer host matrix or a precursor thereof Then, as a third step or steps, any n$_e$eded polymerization or crosslinking reactions can be accomplished and articles can be fashioned from the matrix polymer containing the particle scattering colorant particles. In order to optimize desired visual effects, it is critically important that such second and third step processes do not completely disrupt the translationally periodic arrangement of primary particles within the particle scattering colorants. This can be insured in a number of ways. First, the average size of the particle scattering colorant particles in the smallest dimension should preferably be less than about one-third of the smallest dimension of the polymer article. Otherwise mechanical stresses during article manufacture can disrupt the periodicity of the primary particles in the particle scattering colorant. The particle scattering colorant dimension referred to here is that for the particle scattering colorant in the shaped polymer matrix of the polymer article. However, it is also preferable that the particle sizes of the particle scattering colorant in the fashioned polymer matrix of the polymer article are those initially formed during the aggregation of the arrays of primary particles. The point is again that mechanical steps, such as mechanical grinding, should be avoided to the extent possible if these steps potentially disrupt the translation periodicity within the particle scattering colorant, such as by the production of cracks or grain boundaries within the particle scattering colorant.

Various methods can be used for the first step of forming the particle scattering colorant particles containing translationally periodic primary particles. One useful method is described by A. P. Philipse in Journal of Materials Science Letters 8, pp. 1371–1373 (1989). This article describes the preparation of particles having an opal-like appearance (having intense red and green scattering colors) by the aggregation of silicon spheres having a substantially uniform dimension of about 135 nm. This article also teaches that the mechanical robustness of such particle scattering colorant having a three dimensionally periodic arrangement of silica spheres can be increased by high temperature (a few hours at 600° C.) treatment of the silica sphere assembly. Such treatment decreased the optical effectiveness of the particle scattering colorant, since the particles became opaque. However, Philipse taught that the particle aggregates recover their original iridescent appearance when immersed in silicon oil for a few days. Such treatment (preferably accelerated using either applied pressure, increased temperature, or a reduced viscosity fluid) can also be used to produce the particle scattering colorant used for the present invention. However, it is more preferable if the mechanical robustness is achieved by either (1) forming the translationally periodic assembly of spherical primary particles from a fluid that can be latter polymerized, (2) either imbibing or evaporating a fluid to inside the as-formed translationally periodic particle assembly and then polymerizing this fluid, or (3) annealing the translationally periodic particle assembly (as done by Philipse), either imbibing or evaporating a fluid in inside this particle assembly, and then polymerizing this fluid. Alternatively, materials can be dispersed inside the periodic array of primary particles by gas phase physical or chemical deposition, such as polymerization from a gas phase. Such methods and related methods that will be obvious to those skilled in the art can be employed to make the particle scattering colorants that are used in the present invention embodiment. For example, the primary particles can be either organic, inorganic, or mixed organic and inorganic. Likewise, the optional material that is dispersed within the array of primary particles in the particle scattering colorants can be organic, inorganic, or mixed organic and inorganic. In cases where the particle scattering colorants would be too opaque to optimize visual coloration effects if only gas filled the void space between primary particles, it is useful to use either a liquid or solid material in such spaces. Such liquid or solid material can minimize undesired scattering effects due to fissures and grain boundaries that interrupt the periodic packing of the primary particles. In such case, it is preferable if such fluid or solid has a refractive index in the visible range that is within 5% of the primary particles.

Another method for providing useful particle scattering colorants utilizes polymer primary particles that form an ordered array in polymer host, which serves as a binder.

Films suitable for the preparation of such particle scattering colorants were made by E. A. Kamenetzky et al. as part of work that is described in Science 263, pp. 207–210 (1994). These authors formed films of three-dimensionally ordered arrays of colloidal polystyrene spheres by the ultraviolet-induced setting of a acrylamid-methylene-bisacrylamide gel that contained an ordered array of such spheres. The size of the polymer spheres was about 0.1 microns, and the nearest neighbor separation of the spheres was comparable to the wavelength of visible light radiation. A method for producing films consisting of three-dimensionally ordered polymer primary particles that do not utilize a binder polymer is described by G. H. Ma and T. Fukutomi in Macromolecules 25, 1870–1875 (1992). These authors obtained such iridescent films by casting an aqueous solution of monodispersed poly(4-vinylpyridine) microgel particles that are either 250 or 700 nm in diameter, and then evaporating the water at 60° C. These films were mechanically stabilized by a cross-linking reaction that used either a dihalobutane or p-(chloromethyl)styrene. Particle scattering colorants suitable for the present invention embodiments can be made by cutting either of the above described film types so as to provide particles of desired dimensions. One preferred cutting method is the process used by Meadowbrook Inventions in New Jersey to make glitter particles from metallized films. Various mechanical grinding processes might be used for the same purpose, although it should be recognized that low temperatures might be usefully employed to provide brittleness that enables such a grinding process. For use as particle scattering colorants, it is preferably that the cutting or grinding process produce particles that are of convenient dimension for incorporation without substantial damage in the host matrix, which is preferably a polymer.

The particle scattering colorants of this invention embodiment are preferably formed in required sizes during the aggregation of primary particles. Any methods used for post-formation reduction in particle sizes should be sufficiently mild as to not interfere with the desired periodicity of the primary particles. Likewise, processing conditions during commingling of the particle scattering colorant in either the polymer matrix (or a precursor therefore) and other steps leading to the formation of the final article should not substantially destroy the optical effect of the periodic assembly of primary particles. For particle scattering colorants that are not designed to be mechanically robust, preferred processes for mixing of particle scattering colorant and the matrix polymer (or a precursor thereof) are in a low viscosity fluid state, such as in a monomer, a prepolymer, or a solution of the polymer used for the matrix. For such polymers that are not designed to be mechanically robust, film fabrication and article coating using solution deposition methods are preferred for obtaining the particle scattering colorant dispersed in the shaped matrix polymer. Likewise, for such non-robust particle scattering colorants, polymer matrix formation in shaped form by reaction of a liquid containing the particle scattering colorant is preferred, such as by thermal polymerization, photopolymerization, or polymerization using other actinic radiations. Reaction injection molding is especially preferred for obtaining molded parts that incorporate particle scattering colorants that are not mechanically robust.

In another embodiment of this invention the particle scattering colorant consists of primary particles that are translationally periodic in two dimensions, rather than in three dimensions. Fiber-like primary particles having an approximately uniform cross-section orthogonal to the fiber-axis direction tend to aggregate in this way when dispersed in suitable liquids. Likewise, spherical primary particles tend to aggregate as arrays having two-dimensional periodicity when deposited on planar surfaces. For example, such particles can be formed on the surface of a liquid (or a rotating drum) in a polymer binder that adhesively binds the spherical particles into two-dimensional arrays. These array sheets can then be either cut or ground into the particle sizes that are desired for the particle scattering colorant.

For all of the above invention embodiment of particle scattering colorants that consist of translationally periodic primary particles, it is preferable for the volume occupied by the particle scattering colorants to be less than about 75% or the total volume of the matrix polymer and the particle scattering colorant. The reason for this preference is that the use of low loading levels of the particle scattering colorant can lead to improved mechanical properties for the composite, relative to those obtained at high loading levels. As described above for particle scattering colorants that are not aggregates of periodically arranged primary particles, the visual effect of the particle scattering colorants consisting of ordered arrays of primary particles can be enhanced using electronic transition colorants. Such means of enhancement, as well as methods for achieving color change effects that are switchable, are analogous to those described herein for other types of particle scattering colorants.

From a viewpoint of achieving coloration effects for polymer articles that are easily eliminated during polymer recycling, particle scattering colorants that consist of translationally-ordered primary particle arrays can provide special advantages, especially if the primary particles do not substantially absorb in the visible region and the polymer article does not include an electronic transition colorant. The reason is that processing steps that disrupt such arrays can greatly reduce coloration effects. From this viewpoint of polymer recycling, it is useful to provide particle scattering colorants that are conveniently disrupted by either thermal, mechanical, or chemical steps.

Various applications for which the compositions of this invention have utility will be obvious to those skilled in the art. However, for such articles having switchable coloration or switchable transparency that is broadband in the visible, more detailed descriptions of applications embodiments are provided in the following. One such application is in privacy panels, windows, displays, and signs in which the electric-field- induced switchability of the refractive index of a particle scattering colorant, an electronic transition colorant, or one or more matrix components provides either device operation or an enhancement of device operation. In one example type, the electric- field-induced-change in the refractive index difference between particle scattering colorant and the surrounding matrix component can be used to change either (1) the transparency of an overcoating layer on a sign (so that an underlying message is switched between visible and invisible states) or (2) the transparency of either a privacy panel or a window. For displays and signs, an electric field applied to a matrix layer containing the particle scattering colorant can cause the degree of particle scattering to change—therefore changing the effective viewing angle for an underlying message (such as produced by a back-lighted liquid-crystal display or other types of static or changeable information-providing materials). The electric field can provide switchable properties to either the particle scattering colorant, the matrix material for that colorant, an electronic transition colorant, or any other kind on information display material, or any combination of these materials.

Most preferably, the direction of a refractive index change provided by a particle scattering colorant (caused by an ambient influence, such as an applied electric field, temperature, time-temperature exposure, humidity, or a chemical agent) is in an opposite direction to that of the host materials. In this preferred case, the sensitivity of particle scattering to applied electric field or other ambient influence is enhanced by the refractive index change of both the particle scattering colorant and the matrix material for this colorant. Most preferably, such difference in the direction of refractive index change for particle scattering colorant and matrix material is for all possible light polarization directions. For the above applications, electric fields can be applied in either patterned or unpatterned ways and different electric field can be applied to the particle scattering colorant and other materials, such as the electronic transition colorant. In general the local field that is across a particle scattering colorant in a matrix depends upon the state of aggregation of that colorant in the matrix, so a patterned variation in such degree of aggregation can be used to provide a patterned difference in the response of the particle scattering colorant to an applied electric field. For example, if the electric conductivity and the dielectric constant of the particle scattering colorant are both larger than that of the matrix, an increased voltage drop across the particle scattering colorant can be provided by increasing the degree of particle aggregation. If the switchability in particle scattering is largely a result of the electric field influence on the particle scattering colorant, such aggregation can increase the switchability.

Display or lighting devices that involve electroluminescent compositions provide special application opportunities. For example, the electric-field-switching of particle scattering can be used to either change the degree of diffuse light scattering from electroluminescent light source or to provide a patterned distribution of light emission. In a preferred case, particles of the electroluminescent composition serve as a particle scattering colorant. Another application of this invention in the lighting area is for light bulbs and lighting fixtures that slowly become transmissive after the light switch is pulled, which is an application of thermochromic materials that is described in U.S. Pat. No. 5,083,251, which is incorporated herein by reference. Such light sources are sought after to provide natural time-dependent lighting effects reminiscent of the rising of the sun. An example of such technology that uses a vanishing Δn embodiment is obtained by employing a particle scattering colorant that at room temperature has a refractive index that is unmatched at any point in the visible with that of the host matrix. The particle scattering colorant is selected so that the heating of the light source causes the refractive index or the particle scattering colorant and the matrix to become matched in the visible. Hence, the heating process eliminates particle scattering at the matching wavelength, so that the light source becomes more transmissive. If this matching is desired to be broadband, then there should be little dispersion of the refractive index difference between the particle scattering colorant over the visible wavelength range. In such case where little dispersion in Δn is wanted, the particle scattering colorant and the matrix can be chosen so that the difference in $n_{F-nC}$ for the particle scattering colorant and the matrix component is smaller in absolute magnitude than 0.0001. For this application mode, it is most preferable if the match between the refractive index of the matrix and that of the particle scattering colorant is achieved discontinuously upon increasing temperature above a desired temperature as a consequence of a discontinuous phase transition of either the particle scattering colorant or the matrix material. Otherwise, the color of the transmitted light will vary somewhat continuously with the temperature of the particle scattering colorant and associated matrix material.

Indicators devices for chemical agents, pressure, temperature, moisture pickup, temperature limits (such as freeze or defrost indicators), and time-temperature exposure provide other applications opportunities for the particle scattering colorants of this invention. For such devices, either reversibly or irreversibly switched coloration can result as a consequence of switchability in either the refractive index or the electronic transitions of either particle scattering colorants, matrix components, or electronic transition colorants. For the mentioned time-temperature indicators, a color change can indicate that either a desired thermal exposure has occurred (such as for product processing) or that an undesired thermal exposure has occurred (leading to undesired degradation of a perishable product). Using the vanishing Δn embodiment, the wavelength at which a match in refractive index occurs between matrix and particle scattering colorant can be a function of integrated thermal exposure. For example, polymer films that are used for the packaging of frozen vegetables can undergo a color change when the vegetables have been suitably heated for consumption. As another example of the use of the vanishing Δn embodiment for indicating successful processing, a resin that is undergoing set (such as circuit board) can contain a particle scattering colorant in the setting matrix. The changing refractive index difference between the particle scattering colorant and the matrix then provides a color response that indicates when satisfactory resin set has occurred. A similar useful example of the application of particle scattering coloration (in the vanishing Δn embodiment) is for the indication of moisture pickup for polymers, such as nylon 6—so as to avoid the unsuccessful processing that would occur if the polymer has too high a moisture pickup.

Particle scattering colorants of this invention also enable the convenient labeling of articles, such as polymer films, using the thermal or photochemical changes in refractive index or electronic transitions that occur as a result of patterned laser beam exposure during high speed product packaging operations. For example, numbers written by a laser on a polymer film used for packaging can become visible as a result of light-induced changes in the refractive index difference between the particle scattering colorant and the matrix. Such switchable particle scattering colorant/matrix combinations can also be used as a signature in order to thwart product counterfeiting activities. The particle scattering colorants can even be used for applications where the switchability in refractive index match at ultraviolet light wavelengths provides materials operation. For example, an intelligent sunscreen for bathers can be provided by dispersing a particle scattering colorant in a fluid matrix that is initially matched at ultraviolet solar wavelengths with that of the particles. A light-induced change in refractive index of either the matrix or the particle scattering colorant (so that refractive index matching no longer occurs) can provide an enhanced effectiveness of the sun screen as a function of increasing solar exposure.

The particle scattering colorant embodiments of the present invention are especially useful for the polymer articles formed by desk-top manufacturing methods. The prior art technologies for desk top manufacturing (which is also called rapid prototyping) are described in Modern Plastics, August 1990, pp. 40–43 and in CHEMTECH, October 1990, pp. 615–619. Examples of such methods are various stereolithography technologies that involve either the patterned electron beam polymerization or patterned photopolymerization of monomers. In such case the particle scattering colorant and optional electronic transition colorant can be dispersed in the photomonomer-containing fluid. In addition to providing coloration, such materials can provide additional benefits of reducing shrinkage during resin cure. Vinyl ether oligomers and monomers, that are used in conjunction with triarylsulfonium salts, are especially preferred for these applications. This is the ultraviolet-cured Vectomer™ system that has been developed by Allied-Signal. The particle size of the particle scattering colorant, as well as other possible solid additives, should be sufficiently small that these particles do not settle appreciably during the fabrication of an article. For this reason, particle scattering colorants that have colloidal dimensions are particularly preferred. Another method for rapid prototyping is the Laminated Object Lamination Method in which roll-fed sheets of polymer are cut by a soft-ware guided light beam—thereby building up the article one sheet at a time. In this method the particle scattering colorant and optional electronic colorant can be either located in the polymer sheets, the adhesive that is used to bind the sheets, or both. In another method used for rapid prototyping, thin layers of a powder are deposited on the surface of the article being constructed, and these layers are fused in a patterned manner using a light beam. Alternatively, a binder (or a precursor thereof) is sprayed in a patterned manner on the powder (such as by using ink-jet spraying), thereby enabling article shaping in three dimensions. As another alternative, the powder layers can be replaced by a squeegeed gel layer that is photoset in a patterned manner. In these methods, the particle scattering colorants and optional electronic transition colorants of presently described invention embodiments can be incorporated in the initial powders, the binder, the gel polymer, or combinations thereof Another technology for rapid prototyping builds three-dimensional articles by the patterned extrusion of thin coils of polymer. In such case, the particle scattering colorants and optional electronic colorants of the present invention can be additives to the molten polymer. In any of the above described technologies for rapid prototyping, material coloration can be obtained by using either the large $\Delta n$ embodiment or the vanishing $\Delta n$ embodiment of the present invention.

The following specific examples are presented to more particularly illustrate the invention, and should not be construed as being limitations on the scope of the invention.

EXAMPLE 1

This example describes the achievement of blue coloration and an angle dependent hue of shade by the melt spinning of trilobal fibers from a mixture of a non-absorbing particle scattering colorant (which is a 35 nm average diameter titanium dioxide) and an electronic transition colorant in a nylon matrix polymer. The colored fiber produced in this example consists of a commingled mixture of both the particle scattering colorant (titanium dioxide) and the electronic transition colorant (carbon black) in one nylon matrix. Unless otherwise noted, the nylon used in this and following examples is MBM, a nylon 6 produced by AlliedSignal Inc. Titanium dioxide particles of MT-500B (which is an uncoated titanium dioxide from Daicolor-Pope having an average particle diameter of 35 nm) were dry-blended at a 10% by weight concentration with dry nylon 6. The mixture was extruded, pelletized, and redried. The 10% sample was dry-blended with more nylon 6, extruded, pelletized, and redried to a final let-down concentration of 1%. A carbon black masterbatch produced by AlliedSignal (containing 20% carbon black in nylon 6) was let-down to a 1% carbon black concentration by dry-blending the master batch with nylon 6, extruding, pelletizing, and redrying the mixture. The 1% titanium dioxide in nylon mixture was chip-blended with the 1% carbon black in nylon mixture at a weight ratio of 99.5/0.5, respectively. The resulting mixture was spun into fibers of approximately 50 $\mu$m outer diameter, drawn at a 3.2/1 draw ratio, and texturized. The resulting fiber was a light blue to gray-blue with an angle-dependent hue in shade.

EXAMPLE 2

This example describes the modification of the Example 1 process by the use of Caplube™, which is a vegetable oil based material that acts as a dispersing agent for the titanium dioxide particle scattering colorant. The carbon black concentration in the nylon composite that is commingled with a titanium dioxide/nylon composite is an order of magnitude lower than for Example 1. However, the amount of the carbon black/nylon composite that is commingled with the titanium dioxide/nylon composite is correspondingly increased, so that the titanium dioxide/carbon black ratio obtained by commingling is essentially unchanged from that of Example 1. As a result, the fiber coloration obtained in this example is essentially the same as for Example 1. Titanium dioxide particles of MT-500B having an average diameter of 35 nm were milled with Caplube overnight to a 40 weight percent paste of titanium dioxide in Caplube. The resulting mixture was dry-blended with dry nylon 6 to yield a final concentration of titanium dioxide of 1% by weight. This mixture was then extruded, pelletized, and redried. A 0.1% by weight carbon black composite in nylon 6 was made in a similar way as described in Example 1 for a 1% by weight carbon black concentration. The 1% titanium dioxide in nylon mixture was chip-blended with the 0.1% carbon black in nylon mixture at a weight ratio of 95/5, respectively. Fiber was spun, drawn and texturized from the resulting mixture using the process of Example 1. The resulting fiber was a light blue to gray-blue with an angle-dependent hue in shade.

EXAMPLE 3

This example describes the achievement of a light blue to gray-blue coloration and an angle dependent hue in shade by the melt spinning of trilobal fibers from a mixture of a non-absorbing particle scattering colorant in nylon 6 and carbon black in polypropylene. While the particle scattering colorant (titanium dioxide) and the electronic transition colorant were in separate matrices, these matrices were commingled in a substantially interpenetrating manner by a melt mixing process. A 1% by weight composite of the MT-500B titanium dioxide in nylon was made as described in Example 1. Carbon black was dry-blended, extruded, and pelletized in polypropylene (from Himont Co.) to a final concentration of 0.1 weight percent. The 1% titanium dioxide in nylon mixture was chip-blended with the 0.1% carbon black in polypropylene mixture at a weight ratio of 98/2, respectively. The resulting mixture was spun into fiber, drawn and texturized using the process of Example 1. The resulting fiber was a light blue to gray-blue with an angle-dependent hue in shade.

EXAMPLE 4

This example demonstrates that the coloration effect can be substantially changed if the titanium dioxide/nylon mixture is the sheath and the carbon black/nylon mixture is the core of a trilobal sheath-core fiber. This example contrasts with that of Examples 1 and 2 (where the particle scattering colorant and the electronic transition colorant were mixed together in the nylon) and with Example 3 (where the particle scattering colorant is mixed in nylon 6, the electronic transition colorant was mixed in polypropylene, and these two polymer mixtures were then commingled together prior to the spinning process). Titanium dioxide particles of MT-500B were dry-blended at a 10% weight concentration with nylon 6 and then let-down with additional nylon 6 to a titanium dioxide weight concentration of 5%. A 1% by weight concentration of carbon black in nylon 6 was made as described in Example 1. The titanium dioxide nylon blend (5% titanium dioxide) and the carbon black nylon blend (1% carbon black) were spun into a trilobal sheath-core fiber yarn containing 64 filaments per fiber bundle. The volumetric sheath/core ratio was 60/40 and the individual fibers had a maximum diameter of about 50 microns. The resulting fiber yarn was navy blue. The yam was subsequently drawn at a 3.2/1 draw ratio to produce a 1305 denier yarn. The drawn yarn was then texturized. The drawn and texturized yarn was a navy blue of a very slightly darker shade than the undrawn fiber.

EXAMPLE 5

This example shows the effect of changing from a trilobal sheath/core fiber with a volumetric sheath/core ratio of 60/40 in Example 4 to a round sheath/core fiber with a volumetric sheath/core ratio of 70/30. In both this example and Example 4 the polymer matrix containing the particle scattering colorant is exterior to the polymer matrix containing the electronic absorption colorant. A nylon composite with 5% by weight MT-500B titanium dioxide and a nylon composite with 1% by weight carbon black were made as described in Example 4. The 5% titanium dioxide/nylon blend and the 1% carbon black/nylon blend were spun into round sheath-core fibers that were combined to form a yarn having 128 filaments per fiber bundle. The carbon black phase was in the core and the titanium dioxide in the sheath in the individual fibers, which had an outer diameter of about 50 microns. The volumetric sheath/core ratio was 70/30. The yarn was navy blue, and was a slightly lighter shade than for the yarn in Example 4. The yarn was subsequently. drawn at a 3.2/1 draw ratio and texturized. The resulting drawn and texturized yarn was a navy blue of a very slightly darker shade than the undrawn fiber, but of a lighter shade than the drawn and texturized fiber yarn of Example 4.

EXAMPLE 6

This example shows the combined effect of further decrease in the volumetric sheath/core ratio (compared with that of Examples 4 and 5), a decrease in the carbon black concentration in the core, and a decrease in the titanium dioxide concentration in the sheath. A nylon composite with 1% by weight MT-500B titanium dioxide was made as described in Example 1. A carbon black masterbatch containing 20% carbon black in nylon 6 was let-down in two steps to a 0.03% by weight carbon black concentration. The 1% titanium dioxide/nylon blend and the 0.03% carbon black/nylon blend were spun into round sheath-core fibers, that were combined to form a fiber yarn containing 144 filaments. The carbon black containing nylon was in the core and the titanium dioxide containing nylon was in the sheath in individual fibers having an average outer diameter of about 50 microns. The volumetric sheath/core ratio was 95/5. The resulting yarn was pale blue/gray. The yarn color was significantly lighter than example 4 and 5. This yarn was subsequently drawn at a 3.2/1 draw ratio, resulting in a drawn yarn that is 2637 total denier. The drawn yarn was texturized and processed into sleeves and carpet. The resulting yarn was a blue/gray and had an angle-dependent hue in shade. The shade was a very slightly grayer shade than for the undrawn yam, but of a significantly lighter shade than the drawn and texturized yarn of Example 4.

EXAMPLE 7

This example further shows the effects of changing the titanium dioxide concentration, the carbon black concentration, and the sheath/core ratio for sheath/core fibers. In this example the polymer matrix containing the particle scattering colorant is substantially exterior to the polymer matrix containing the electronic absorption colorant. Titanium dioxide particles of MT-500B having an average dimension of 35 nm were dry-blended at a 10% weight concentration with nylon 6. The mixture was extruded, pelletized, and redried. The 10% sample was dry-blended with more nylon 6, extruded, pelletized, and redried to a final let-down gravimetric concentration of 6.2%. A carbon black masterbatch containing 20% by weight carbon black in nylon 6 was let-down to a 1.54% by weight carbon black concentration by dry-blending the master batch with nylon 6, extruding, pelletizing, and redrying the mixture. The 6.2% titanium dioxide/nylon blend and the 1.54% carbon black/nylon blend were spun into trilobal sheath-core fibers, and these fibers were combined to form a yarn containing 64 filaments. The carbon black phase was in the core and the titanium dioxide in the sheath for the individual fibers, and the fiber outer diameter was about 50 microns. The volumetric sheath/core ratio was 80/20. The resulting fiber was blue with a light purple cast. The fiber color was lighter shade than in Example 5. The yarn was subsequently drawn at a 3.2/1 draw ratio, texturized, and processed into sleeves and carpet. The resulting articles were medium blue.

EXAMPLE 8

This example further shows the effect of changing the carbon black concentration and the sheath/core ratio for sheath/core fibers, as compared with that for Examples 4 and 5. In this example the polymer matrix containing the particle scattering colorant is substantially exterior to the polymer matrix containing the electronic absorption colorant. Titanium dioxide particles of MT-500B having an average dimension of 35 nm were dry-blended at a 10% weight concentration with nylon 6. The mixture was extruded, pelletized, and redried. The 10% sample was dry-blended with more nylon 6, extruded, pelletized, and redried to a final let-down concentration of 5% by weight titanium dioxide. A carbon black masterbatch containing 20% carbon black in nylon 6 was let-down to a 1.9% by weight carbon black concentration by dry-blending the master batch with nylon 6, extruding, pelletizing, and redrying the mixture. The 5.0% titanium dioxide/nylon blend and the 1.9% carbon black/nylon blend were spun into trilobal sheath-core fibers having a maximum outer diameter of about 50 microns. These fibers were combined to form a yarn containing 64 filaments that had a total denier of 3025. The carbon black phase was in the core and the titanium dioxide in the sheath. The volumetric sheath/core ratio was 65/35. The resulting yarn was a dark blue. The yarn color was lighter shade than in Example 4. The yarn was subsequently drawn at a 3.2/1 draw ratio, texturized, and processed into a cut-pile carpet and woven sleeves. These articles were a dark blue.

EXAMPLE 9

This example, which can be compared with Examples 4 and 5, shows how to obtain a very dark blue coloration. In this example the polymer matrix containing the particle scattering colorant is exterior to the polymer matrix containing the electronic absorption colorant. Titanium dioxide particles of MT-500B having an average dimension of 35 nm were dry-blended at a 10% weight concentration with nylon 6. The mixture was extruded, pelletized, and redried. The 10% sample was dry-blended with more nylon 6, extruded, pelletized, and redried to a final let-down gravimetric titanium dioxide concentration of 3.8%. A carbon black masterbatch containing 20% by weight carbon black in nylon 6 was let-down to a 0.46% by weight carbon black concentration by dry-blending the master batch with nylon 6, extruding, pelletizing, and redrying the mixture. The 3.8% titanium dioxide/nylon blend and the 0.46% carbon black/nylon blend were spun into trilobal sheath-core fibers having a maximum exterior diameter of 50 microns. The carbon black containing nylon was in the core and the titanium dioxide containing nylon was in the sheath for the individual fibers. These fibers were combined to provide a yarn containing 64 filaments that had a total denier of 2064. The volumetric sheath/core ratio was 50/50 for the individual fibers and the color of these fibers was a dark navy blue. The yarn color was darker than in Example 4. The fiber was subsequently drawn at a 3.2/1 draw ratio, texturized, and processed into a cut-pile carpet. This carpet was a dark, navy gray/blue.

EXAMPLE 10

This example shows the effect of changing the particle size of the titanium dioxide compared with that used for above examples that use titanium dioxide as a particle scattering colorant, such as Example 8. In this example, although the titanium dioxide is claimed to have a "blue tone in whites and tints", the particle size is too large for invention embodiments, and the titanium dioxide does not satisfy the criteria for a particle scattering colorant in high $\Delta n$ embodiments. This $TiO_2$ is here shown to produce a gray fiber. Titanium dioxide 555 from Whittaker, Clark, and Daniels, Inc. was dry-blended at a 10% weight concentration with nylon 6. The mixture was extruded, pelletized, and redried. The 10% sample was dry-blended with more nylon 6, extruded, pelletized, and redried to a final let-down concentration of 5%. A carbon black masterbatch containing 20% by weight carbon black in nylon 6 was let-down to a 1.9% by weight carbon black concentration by dry-blending the master batch with nylon 6, extruding, pelletizing, and redrying the mixture. The 5.0% titanium dioxide/nylon blend and the 1.9% carbon black/nylon blend were spun into trilobal sheath-core fibers that had a maximum outer diameter of about 50 microns. The carbon black phase was in the core and the titanium dioxide was in the sheath. The volumetric sheath/core ratio was 65/35. A yarn was formed by combining 64 such fibers. This yarn was a medium gray and did not have a blue tone. The yarn was subsequently drawn at a 3.2/1 draw ratio, texturized, and processed into a cut-pile carpet. The resulting carpet was a medium gray. Hence, the titanium was not effective in acting as a particle scattering colorant.

EXAMPLE 11

This example supports the demonstration of Example 10 that the use of too large a particle size for the titanium dioxide particles provides materials that do not have significant particle scattering coloration. As for Example 10, the titanium dioxide used was titanium dioxide 555 from Whittaker, Clark, and Daniels, Inc. The difference between this example and Example 10 is that the trilobal carpet fibers had a sheath that was 6.2 weight percent titanium dioxide in nylon, a core that was a 1.54 weight percent carbon black in nylon, and the volumetric sheath/core ratio before drawing was 80/20. Other than the increase in the particle size of the titanium dioxide, all preparative details are the same as for Example 7. However, while the cut-pile carpet of Example 7 was a medium blue, the carpet produced in this example was a light gray.

EXAMPLE 12

This example demonstrates that, by producing a yarn in which different fibers have a slightly different sheath/core ratio along their lengths, one can produce a yarn with multiple shades without having streaks of color. In this example the polymer matrix containing the particle scattering colorant is exterior to the polymer matrix containing the electronic absorption colorant. A nylon composite with 5% by weight MT-500B titanium dioxide and a nylon composite with 1% by weight carbon black were made as described in Example 4. The 5% titanium dioxide/nylon blend and the 1% carbon black/nylon blend were spun into round sheath-core fibers having diameters of about 50 microns. The carbon black composite was in the core and the titanium dioxide composite was in the sheath. The spinning pack was set-up to permit variation in the sheath/core ratio during the spinning of individual filaments. This variation in sheath/core ratio was achieved by varying the pressure generated by the pump used to provide the sheath material stream for the filaments, while keeping constant the pressure generated by the pump used to provide the core material stream. The average volumetric sheath/core ratio was 90/10, although this ratio varied along the fiber length according to the pressure provided by the pump for the core material. The different sections of the resulting yarn were different shades of blue, ranging from an off-white up to a navy blue. The fiber was subsequently drawn at a 3.2/1 draw ratio, and texturized. The resulting yarn was multi-colored and contained individual filaments lengths having shades from an off-white to a navy blue.

EXAMPLE 13

This example shows how one can obtain various other colors for sheath-core fibers. In this example the polymer matrix containing the particle scattering colorant is substantially exterior to the polymer matrix containing the electronic absorption colorant. The electronic absorption colorant in this example is a red pigment called Fire Engine Red. The Fire Engine Red nylon 6 sample was obtained from AlliedSignal and contains a red pigment from Stanridge Color Company. A 6.2% by weight composite of MT-500B titanium dioxide in nylon 6 was made as described in Example 7. The 6.2% titanium dioxide/nylon blend and the Fire Engine Red/nylon blend were spun into trilobal sheath-core fibers having a volumetric sheath/core ratio of 65/35 and a maximum diameter of about 50 microns. These fibers were combined at the spinneret to form a yarn containing 64 filaments. This yarn was purple. The red pigment containing nylon composite was in the core and the titanium dioxide containing nylon composite was in the sheath of individual fibers. The yarn was subsequently drawn at a 3.2/1 draw ratio, texturized, and processed into sleeves. The resulting sleeves were a shade of purple.

EXAMPLE 14

This example shows that zinc oxide can be used together with carbon black to provide a blue coloration for nylon fibers. The nanosized zinc oxide was obtained from Nyacol Company. Fibers were obtained by spinning a zinc oxide/nylon composite through an apparatus that had previously been used for the spinning of carbon black/nylon composite. The result was the achievement of a blue coloration for the zinc oxide/nylon fibers as a result of the pickup of the carbon black/nylon composite that was residual in the spinning apparatus. Six pellets of 20% by weight carbon black in nylon and six pellets of 10 ppm carbon black in nylon were mixed together and pushed through a melt indexer, which was used as the spinning apparatus. Then three successive 2–3 gram batches of 1% by weight of zinc oxide in nylon were pushed through the melt indexer to give a first pass, second pass, and third pass fiber samples. These filaments were gray with a blue cast. The color of fibers from each successive pass was somewhat lighter than those for the previous passes.

EXAMPLE 15

This experiment demonstrates the coloration resulting from the extrusion of nylon from a mixture of a non-absorbing particle scattering colorant and an electronic transition colorant in a nylon matrix polymer. The particle scattering colorant in this example was titanium dioxide and the electronic transition colorant was iron oxide. Titanium dioxide particles of MT-500B having an average particle dimension of 35 nm were dispersed in nylon 6 to a 2% by weight blend. Iron oxide was dry-blended with nylon 6 to a 1% by weight blend. Ten grams of the 1% iron oxide/nylon sample, 495 g of the 2% titanium dioxide mixture, and 495 g of nylon 6 were dry-blended, extruded, pelletized, and redried to yield pellets with overall concentrations of 0.01% iron oxide and 0.99% titanium dioxide. The pellets were a bright, rosy pink with a light bluish undertone.

EXAMPLE 16

This example serves as a comparison with example 15 and demonstrates the standard effects expected for iron oxide. Iron oxide was dry-blended with nylon 6 to a 1% by weight blend. Ten grams of the 1% iron oxide/nylon sample was dry-blended with 990 g of nylon 6. The sample was extruded, pelletized, and redried to yield pellets with overall concentrations of 0.01% iron oxide. The pellets were a watery, dull, salmon pink.

EXAMPLE 17

This experiment serves as a comparison with Example 15 and 16 and demonstrates the standard effects expected for iron oxide and a particle size titanium dioxide that is not effective as a particle scattering colorant. For this example titanium dioxide 555 available from Whittaker, Clark, and Daniels, Inc. was used. Note that, although this titanium dioxide is used to produce the blue tone described in the literature in white and tints, it is a larger particle size than the MT500-B and does not provide the novel optical effects seen in this invention (Example 15). Titanium dioxide particles of Whittaker 555 have a particle size such that a maximum of 0.01% is retained on a 325 mesh screen. The estimated average particle dimension is above 200 nm. The Whittaker titanium dioxide was dispersed in nylon 6 to a 5% by weight blend. Iron oxide was dry-blended with nylon 6 to a 1% by weight blend. Ten grams of the 1% iron oxide/nylon sample, 198 g of the 5% titanium dioxide mixture, and 792 g of nylon 6 were dry-blended, extruded, pelletized, and redried to yield pellets with overall concentrations of 0.01% iron oxide and 0.99% titanium dioxide. The pellets were a soft, pale pink with no bluish undertone.

EXAMPLE 18

This experiment, which is for comparison with Example 15, demonstrates the achievement of a blue coloration for polymer pellets formed from a mixture of a non-absorbing particle scattering colorant and an electronic transition colorant in a nylon matrix polymer (where carbon black serves as the electronic transition colorant and titanium dioxide serves as the particle scattering colorant). Titanium dioxide particles of MT-500B having an average particle dimension of 35 nm were dispersed in nylon 6 to a 2% by weight blend. Carbon black was let-down to a 1% by weight blend from a 20% by weight masterbatch in nylon 6. Nylon 6, the 1% carbon black, and the 2% titanium dioxide mixture were dry-blended, extruded, pelletized, and redried to yield nylon pellets having overall concentrations of 0.005% carbon black and 0.25% titanium dioxide. The pellets were a light blue with a gray cast.

EXAMPLE 19

This experiment serves as a comparison with example 18 and demonstrates the standard effects expected for titanium dioxide and carbon black. For this example the titanium dioxide 555 that was obtained from Whittaker, Clark, and Daniels, Inc. was used. It is noted that although this titanium dioxide is used to produce the blue tone described in the literature in white and tints, it is a larger particle size than the MT500-B and does not provide the novel optical effects seen in this invention (Example 18). Titanium dioxide particles of 555 from Whittaker, Clark, and Daniels, Inc. were dispersed in nylon 6 to a 2% by weight blend. Carbon black was let-down to a 1% by weight blend from a 20% by weight masterbatch in nylon 6. Nylon 6, carbon black (1%), and the 2% titanium dioxide mixture were dry-blended, extruded, pelletized, and redried to yield pellets with overall concentrations of 0.005% carbon black and 0.25% titanium dioxide. The pellets were a gray with no blue undertone.

EXAMPLE 20

This experiment demonstrates the achievement of a gray/blue metallic-looking fiber by using a mixture of a non-absorbing particle scattering colorant (titanium dioxide) and an electronic transition colorant (carbon black) in a nylon matrix polymer. Titanium dioxide particles of MT-500B having an average particle diameter of 35 nm were dispersed in nylon 6 to a 2% by weight blend. Carbon black was let-down to a 1% by weight blend from a 20% by weight masterbatch in nylon 6. A total of 417.5 g of 2% titanium dioxide, 83.5 g of 1% carbon black, and 1503 g of nylon 6 were dry-blended, extruded, pelletized, and redried to yield pellets with overall concentrations of 0.04167% carbon black and 0.4167% titanium dioxide. The pellets were a dark blue-gray. The pellets were spun into a gray/blue metallic-looking fiber.

EXAMPLE 21

This experiment demonstrates the achievement of novel optical effects and coloration that are modified compared with those of Example 20. These effects were again achieved using a mixture of titanium dioxide and carbon black in nylon. The titanium dioxide is a non-absorbing particle scattering colorant and graphite is the electronic transition colorant. Titanium dioxide particles of MT-500B having an average particle diameter of 35 nm were dispersed in nylon 6 to a 2% by weight blend. Carbon black was let-down to a 1% by weight blend from a 20% by weight masterbatch in nylon 6. A total of 208.75 g of 2% titanium dioxide, 41.75 g of 1% carbon black, and 1753.5 g of nylon 6 were dry-blended, extruded, pelletized, and redried to yield pellets with overall concentrations of 0.0208% carbon black and 0.208% titanium oxide. The pellets were a dark blue with gray undertones. The pellets were spun into fibers producing a gray-blue metallic-looking fiber of slightly brighter metallic color than Example 20.

EXAMPLE 22

This example is to illustrate the effects obtainable for an absorbing particle scattering colorant. In this example gold particles were used to confer a pink coloration to nylon. A gold colloid solution was prepared by heating 95 ml of an aqueous gold chloride (III) solution containing 5 mg of gold. When this solution reached the boiling point, 5 ml of an aqueous 1% sodium citrate solution was added with rapid stirring. No color was visible at first. The scattering centers formed over a five-minute period. In this period the solution changed from a grayish-blue to a red. Five ml of this solution was added to 5 g of finely ground nylon and the mixture was heated in a 100° C. vacuum oven overnight to drive off the water. The result was a pink nylon sample. This sample was extruded into fiber filaments that evidenced a pink coloration with some purplish-pink spots.

EXAMPLE 23

This example is for contrast with Example 22, and it shows that the colloidal scattering colorant should be trapped in the nylon (rather than aggregated on the surface) in order to obtain the desired coloration effect for nylon. A red colored gold colloid solution was prepared as described in Example 22. This solution was added to an equal amount of millimeter size nylon pellets and the mixture was heated to 100° C. The water boiled off, leaving only gray pellets of nylon.

EXAMPLE 24

Similar in technique to Example 22, this example demonstrates that colloidal metals can be used to produce color in nylon 6. A gold colloid solution was prepared by first heating 237.5 ml of an aqueous gold trichloride solution (containing 0.005% gold) to boiling. Then 12.5 ml of a 1% aqueous trisodium citrate solution was added to the boiling gold trichloride solution during rapid stirring. Over 30 minutes, as the solution boiled, the color changed from very pale grayish blue to a very deep red. Upon cooling, all 250 ml of this deep red colloidal gold solution was added to 500 g of finely ground nylon 6 and thoroughly mixed to produce an even color dispersion. All of the water in this mixture was then evaporated by drying the mixture overnight in a vacuum oven at 110° C. The resulting intensely pink powder contained approximately 0.0025% colloidal gold. This powder was then spun into pink fibers containing 12 filaments per fiber bundle. The fibers were drawn at a 3:1 draw ratio to produce pale pink drawn fibers.

EXAMPLE 25

This example demonstrates the generation of particle scattering colorants during extrusion using metal salts. No trisodium citrate or comparable non-polymeric reducing agent was added. 0.104 g of an aqueous 5% solution (by weight) of $AgNO_3$ was diluted with 10 ml deionized water. The mixture was added to 30 g of ground nylon 6. The sample was mixed, placed into a vacuum oven, and held at 85° C. for 3.5 hours. The temperature was raised to 100–105° C. for two hours. The resulting white or off white powder was removed from the oven. This powder was then spun through a melt indexer to yield a bright yellow filament.

EXAMPLE 26

This example further illustrates the use of metal salts to produce color in nylon. $AuCl_3$ (0.015 g) was dissolved in 3.75 ml of deionized water. Nylon 6 (7.5 g) was added and the mixture was blended, placed in a vacuum oven and held at 85° C. for 3.5 hours. The temperature was raised to 100–105° C. for two hours. The resulting light pink powder was removed from the oven. The powder was then spun through a melt indexer to yield a deep crimson filament.

EXAMPLE 27

This example demonstrates that hollow white polymer fibers containing titanium dioxide particle scattering colorants become blue in appearance when these fibers are fluid filled with an electronic transition colorant. Titanium dioxide particles having an average diameter of 35 nm were dry-blended with dry MBM nylon 6 to obtain a 6.2% loading level of the titanium dioxide in the nylon. The mixture was extruded, pelletized, and redried. The samples were spun into hollow white fibers that were then cut into staple. The fiber was put into a water solution containing $n_e$grosin black. The black solution entered the fiber ends through capillary action, thereby producing a blue fiber.

EXAMPLE 28

This example evidences the extraordinarily high fade resistance of the carpets and fibers produced using particle scattering colorants. The carpets and fibers from Examples 7 and 8, as well as commercially available pigmented nylon fibers (AlliedSignal) and commercially available dyed carpet (AlliedSignal) of similar colors, were put into undiluted household bleach solutions (a 5.25% sodium hypochlorite aqueous solution) for 72 hours. The carpets and fibers from Examples 7 and 8 evidenced no fading. On the other hand, the fibers and carpets that were either dyed or pigmented using conventional technology all faded, such fading being most severe for the dyed fibers and carpets.

EXAMPLE 29

This example evidences the high fade resistance to ozone exposure of woven articles (sleeves) produced using particle scattering colorants. Sleeves from Examples 7 and 8, as well as sleeves made from commercially available pigmented nylon fibers (AlliedSignal) and commercially available dyed fibers (AlliedSignal) of similar colors, were put under a standard ozone test. The sleeves from Examples 7 and 8 had no visible fading. Quite different results were obtained for the articles made by conventional technologies for producing coloration: the fibers from the sleeves of pigmented fibers had slight fading and the sleeves from dyed fibers had substantial fading.

EXAMPLE 30

This example shows that similar coloration effects as obtained in Example 8 result when the nylon fiber sheath in this example is replaced with either a derivatized polypropylene sheath or a polyethylene terephthalate sheath. Both in this example and in Example 8, the particle scattering colorant in the fiber sheath was titanium dioxide particles of MT-500B having an average diameter of 35 nm. Also, in all of these cases the fiber core was a carbon-black/ nylon composite. This change in the sheath polymer did not appreciably change fiber coloration, which was dark blue.

EXAMPLE 31

This experiment demonstrates the method employed for determining whether or not a candidate material has the properties required for use as a particle scattering colorant for high $\Delta n$ embodiments of this invention. A 0.001% by weight dispersion of the candidate particle scattering colorant was prepared in ethylene glycol. The transmittance of the dispersion was measured from 380 to 750 nm using a Perkin Elmer Lambda 7 UV/Visible spectrophotometer, and the absorbance was calculated from this transmittance. The minimum absorbance ($A_{min}$) and maximum absorbance ($A_{max}$) were identified in the visible wavelength range between 380 and 750 nm. The required ratio was then calculated as the effective absorbance at the absorbance maximum divided by the effective absorbance at the absorbance minimum. The obtained results are listed below.

| $A_{max}/A_{min}$ Scattering Colorant? | Material | Particle |
|---|---|---|
| 3.06 | MT-500B titanium dioxide (Daicolor-Pope) | Yes |
| 1.26 | Standard particle titanium dioxide(1 um, Aldrich) | No |
| 9.0 | Colloidal silica (Nissan Chemical Industries, Ltd) | Yes |
| 3.55 | UV Titan P580 titanium dioxide (Kemira) | Yes |
| 4.52 | Tin oxide (5% solution, Nyacol, The PQ Corp) | Yes |
| 18.14 | Zirconia (10% solution, 100 nm size, Nyacol, The PQ Corp) | Yes |
| 1.55 | Titanium Dioxide 555 (Whittaker, Clark and Daniels) | No |
| 3.31 | MT-500 HD Coated Titanium dioxide (Diacolor-Pope) | Yes |

All of the above particulate materials are substantially non-absorbing in the visible. According to whether or not $A_{max}/A_{min}$ is above or below 2, the investigated material is a particle scattering colorant for high $\Delta n$ embodiments of this invention. With increasing values of this ratio above 2, the effectiveness of the particle scattering colorant for producing coloration is generally increased.

EXAMPLE 32

This example evidences the high fade resistance to light exposure of woven articles (sleeves) produced using particle scattering colorants. Sleeves from Example 8 and 29 were exposed to a severe test of lightfastness: GM 112 KJ for 3 days. The sleeves had excellent lightfastness (delta $\epsilon$) ratings of 0.87 for the nylon/nylon sleeve and 0.79 for the PET/nylon sleeve. No fading was observed for the PET/nylon sleeve.

EXAMPLE 33

This example evidences the high bleach resistance of the color generated using particle scattering colorants. Fibers from example 23 were put into an undiluted solution of household bleach (a 5.25% sodium hypochlorite aqueous solution). There was no color fading evident after 96 hours exposure to bleach solution.

What is claimed is:

1. A process for producing a colored shaped article comprising combining a colloidal particle scattering colorant, or a precursor thereof, with either a molten monomer or a molten mixture of monomers and thereafter polymerizing the molten monomer or molten mixture of monomers by the application of sufficient thermal treatment or irradiation in a shaped cavity to directly provide a colored shaped polymer article.

2. The process of claim 1, wherein the monomer or monomer mixture is thermally polymerized.

3. The process of claim 1, wherein the said colloidal particle scattering colorant is a colloidal metal.

4. The process of claim 2, wherein the monomer or monomer mixture comprises caprolactam and the colloidal particle scattering colorant is a colloidal metal.

* * * * *